(12) United States Patent
Tanaka et al.

(10) Patent No.: US 8,012,591 B2
(45) Date of Patent: Sep. 6, 2011

(54) HYDROPHILIC COMPOSITION AND HYDROPHILIC MEMBER

(75) Inventors: Satoshi Tanaka, Kanagawa (JP); Makoto Fukuda, Kanagawa (JP); Satoshi Hoshi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 12 days.

(21) Appl. No.: 11/856,551

(22) Filed: Sep. 17, 2007

(65) Prior Publication Data

US 2008/0176085 A1    Jul. 24, 2008

(30) Foreign Application Priority Data

Sep. 21, 2006 (JP) ............... P2006-256212
Feb. 16, 2007 (JP) ............... P2007-036605
Sep. 5, 2007 (JP) ............... P2007-230027

(51) Int. Cl.
  *B32B 17/06* (2006.01)
  *B32B 9/00* (2006.01)
  *B32B 15/04* (2006.01)
  *C08G 77/00* (2006.01)

(52) U.S. Cl. ........ 428/426; 428/428; 428/446; 428/457; 528/12

(58) Field of Classification Search ............... 528/92, 528/92 G, 92 J, 12; 428/426, 428, 446, 457
See application file for complete search history.

(56) References Cited

U.S. PATENT DOCUMENTS

| | | | |
|---|---|---|---|
| 4,106,948 A | 8/1978 | Cooper et al. | |
| 4,147,603 A | 4/1979 | Pacifici et al. | |
| 4,168,112 A | 9/1979 | Ellis et al. | |
| 4,478,909 A | 10/1984 | Taniguchi et al. | |
| 4,539,061 A | 9/1985 | Sagiv | |
| 5,053,048 A | 10/1991 | Pinchuk | |
| 5,134,021 A | 7/1992 | Hosono et al. | |
| 5,154,217 A | 10/1992 | Kanamaru | |
| 5,372,851 A | 12/1994 | Ogawa et al. | |
| 5,451,428 A | 9/1995 | Rupp | |
| 5,498,666 A | 3/1996 | Nambu et al. | |
| 5,518,767 A | 5/1996 | Rubner et al. | |
| 5,536,573 A | 7/1996 | Rubner et al. | |
| 5,569,573 A | 10/1996 | Takahashi et al. | |
| 5,635,572 A | 6/1997 | Ohnishi et al. | |
| 5,652,059 A | 7/1997 | Margel | |
| 5,807,636 A | 9/1998 | Sheu et al. | |
| 6,013,372 A | 1/2000 | Hayakawa et al. | |
| 6,013,855 A | 1/2000 | McPherson et al. | |
| 6,082,426 A | 7/2000 | Colom | |
| 6,099,852 A | 8/2000 | Jen | |
| 6,172,152 B1 | 1/2001 | Kim et al. | |
| 6,242,155 B1 * | 6/2001 | Yamasaki et al. | 430/270.1 |
| 6,254,634 B1 | 7/2001 | Anderson et al. | |
| 6,271,293 B1 | 8/2001 | Karuga et al. | |
| 6,368,658 B1 | 4/2002 | Schwarz et al. | |
| 6,440,569 B1 | 8/2002 | Kanamori et al. | |
| 6,455,222 B1 * | 9/2002 | Fukino et al. | 430/270.1 |
| 6,516,722 B2 * | 2/2003 | Yamasaki | 101/467 |
| 6,528,584 B2 | 3/2003 | Kennedy et al. | |
| 6,533,415 B2 | 3/2003 | Watanabe | |
| 6,534,237 B1 * | 3/2003 | Kawamura et al. | 430/270.1 |
| 6,555,619 B1 | 4/2003 | Kennedy et al. | |
| 6,596,346 B2 | 7/2003 | Bernard et al. | |
| 6,670,096 B2 * | 12/2003 | Kawamura et al. | 430/271.1 |
| 6,696,515 B2 | 2/2004 | Yamaya et al. | |
| 6,733,884 B2 * | 5/2004 | Brown | 428/404 |
| 6,793,960 B1 | 9/2004 | Michal et al. | |
| 6,852,353 B2 | 2/2005 | Qiu et al. | |
| 6,878,399 B2 | 4/2005 | Chabrecek et al. | |
| 6,893,685 B2 | 5/2005 | Qiu et al. | |
| 6,953,560 B1 | 10/2005 | Castro et al. | |
| 7,026,014 B2 | 4/2006 | Luzinov et al. | |
| 7,040,756 B2 | 5/2006 | Qiu et al. | |
| 7,067,194 B2 | 6/2006 | Mao et al. | |
| 7,291,427 B2 | 11/2007 | Kawamura et al. | |
| 7,311,970 B2 | 12/2007 | Michal et al. | |
| 7,335,185 B2 | 2/2008 | Tang et al. | |
| 7,396,582 B2 | 7/2008 | Claude et al. | |
| 7,462,437 B2 * | 12/2008 | Hoshi et al. | 430/270.1 |
| 2002/0012790 A1 | 1/2002 | Shah et al. | |
| 2002/0023565 A1 * | 2/2002 | Kawamura et al. | 101/453 |
| 2002/0134266 A1 * | 9/2002 | Yamasaki et al. | 101/453 |
| 2002/0182529 A1 * | 12/2002 | Hoshi et al. | 430/138 |
| 2003/0118849 A1 * | 6/2003 | Yamasaki et al. | 428/447 |
| 2003/0143407 A1 * | 7/2003 | Yamasaki et al. | 428/447 |
| 2003/0164105 A1 | 9/2003 | Tashiro | |
| 2004/0054069 A1 * | 3/2004 | Kusudou et al. | 524/557 |
| 2004/0059040 A1 | 3/2004 | Moller et al. | |
| 2004/0059045 A1 | 3/2004 | Kitchin et al. | |
| 2004/0060465 A1 * | 4/2004 | Yamasaki et al. | 101/453 |

(Continued)

FOREIGN PATENT DOCUMENTS

EP    0782016 A2    7/1997

(Continued)

OTHER PUBLICATIONS

Article of Daily Newspaper Chemical Industry, Jan. 30, 1995.

(Continued)

*Primary Examiner* — Robert Loewe
(74) *Attorney, Agent, or Firm* — Birch, Stewart, Kolasch & Birch, LLP

(57) ABSTRACT

A hydrophilic composition contains (A) a hydrophilic polymer represented by the following general formula (I); and (B) an alkoxide compound of an element selected from Si, Ti, Zr and Al:

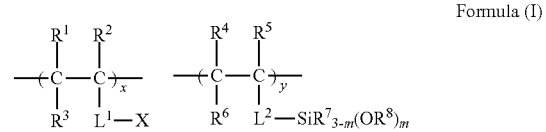

Formula (I)

wherein the symbols in the formula are defined in the specification.

6 Claims, No Drawings

U.S. PATENT DOCUMENTS

| | | | |
|---|---|---|---|
| 2004/0191527 A1 | 9/2004 | Saitoh | |
| 2005/0069811 A1* | 3/2005 | Mitsumoto et al. | 430/270.1 |
| 2005/0074556 A1* | 4/2005 | Kano | 427/384 |
| 2005/0153239 A1* | 7/2005 | Hoshi et al. | 430/270.1 |
| 2006/0032390 A1* | 2/2006 | Hoshi et al. | 101/453 |
| 2006/0040280 A1 | 2/2006 | Lee et al. | |
| 2006/0046193 A1* | 3/2006 | Shimada et al. | 430/270.1 |
| 2006/0046194 A1* | 3/2006 | Hoshi et al. | 430/270.1 |
| 2006/0188813 A1* | 8/2006 | Shimada et al. | 430/270.1 |
| 2006/0219117 A1* | 10/2006 | Hoshi et al. | 101/453 |
| 2007/0006760 A1* | 1/2007 | Hoshi | 101/454 |
| 2007/0092735 A1 | 4/2007 | Bruner et al. | |
| 2007/0122745 A1 | 5/2007 | Yamasaki et al. | |
| 2007/0149742 A1* | 6/2007 | Tanaka et al. | 528/25 |
| 2007/0232735 A1 | 10/2007 | Tanaka et al. | |
| 2008/0004390 A1* | 1/2008 | Aoshima et al. | 524/430 |
| 2008/0071054 A1* | 3/2008 | Yamasaki et al. | 528/32 |
| 2008/0097017 A2 | 4/2008 | Tanaka et al. | |
| 2008/0102286 A1* | 5/2008 | Fukuda et al. | 428/446 |
| 2008/0176085 A1* | 7/2008 | Tanaka et al. | 428/426 |
| 2008/0177022 A1* | 7/2008 | Yamasaki et al. | 528/31 |
| 2008/0207849 A1* | 8/2008 | Yamasaki et al. | 525/477 |
| 2008/0226928 A1* | 9/2008 | Tanaka et al. | 428/446 |
| 2008/0241557 A1* | 10/2008 | Hoshi et al. | 428/457 |
| 2008/0292800 A1* | 11/2008 | Murayama et al. | 427/385.5 |
| 2008/0300359 A1 | 12/2008 | Hoshi et al. | |
| 2009/0029179 A1 | 1/2009 | Fukuda et al. | |
| 2009/0069506 A1 | 3/2009 | Shimada et al. | |
| 2009/0239051 A1 | 9/2009 | Fukuda et al. | |
| 2009/0263605 A1 | 10/2009 | Hoshi et al. | |
| 2009/0274914 A1 | 11/2009 | Hoshi et al. | |

FOREIGN PATENT DOCUMENTS

| | | |
|---|---|---|
| EP | 0903224 A2 | 3/1999 |
| EP | 0978324 A2 | 2/2000 |
| EP | 1226976 A1 | 7/2002 |
| EP | 126676 A2 | 12/2002 |
| EP | 1318027 A2 | 6/2003 |
| EP | 1 516 747 A1 | 3/2005 |
| EP | 1625945 A2 | 2/2006 |
| EP | 1923363 A2 | 5/2006 |
| GB | 621375 | 10/1959 |
| JP | 59-179605 A | 10/1984 |
| JP | 64-86101 A | 3/1989 |
| JP | 4-338901 A | 11/1992 |
| JP | 6-29332 B2 | 4/1994 |
| JP | 6-145453 A | 5/1994 |
| JP | 6-246237 A | 9/1994 |
| JP | 7-11152 A | 1/1995 |
| JP | 7-16940 A | 1/1995 |
| JP | 9-302286 A | 11/1997 |
| JP | 11-95417 A | 4/1999 |
| JP | 2000-355674 A | 12/2000 |
| JP | 2002-361800 A | 12/2002 |
| JP | 2002-370467 A | 12/2002 |
| JP | 2003-63166 A | 3/2003 |
| JP | 2003-527978 A | 9/2003 |
| JP | 2004-256586 A | 9/2004 |
| JP | 2005-263839 A | 9/2005 |
| JP | 2007-246616 A | 9/2007 |
| WO | WO 94/23954 A1 | 10/1994 |
| WO | WO-96/29375 A1 | 9/1996 |
| WO | WO 01/18139 A1 | 3/2001 |
| WO | WO 2004/002546 A1 | 1/2004 |
| WO | WO 2004/052970 A1 | 6/2004 |
| WO | WO 2006/038540 A1 | 4/2006 |

OTHER PUBLICATIONS

Advisory Action issued Apr. 26, 2010, in co-pending U.S. Appl. No. 11/856,578.
Advisory Action issued Mar. 11, 2010, in co-pending U.S. Appl. No. 11/603,190.
Advisory Action issued Nov. 20. 2008, in co-pendiflg U.S. Appl. No. 11/356,397.
Agawa et al., "Composition for non-aqueous coating materials of industrial products, is formed by blending silicon-type surface active agents with respect to polymers having hydrolysable silicon group", Apr. 13, 2006, XP-002556273, Database WPI Week 200630; AN 2006-293821.
Ando et al, "Articles painted with hydrophilic curable composition useful as top coat, comprising acrylic copolymer containing alkoxysilyl, tetraethyl silicate and/or its condensed material and curing catalyst". Dec. 26, 2000, XP-002556272, Database WPI Week 200134; AN 2001-320527.
Andou et al., "Cured product obtd. from top:coating compsn. for metal, ceramic, glass, cement etc.—comprises synthetic resin for coating e.g., partly hydrolysed condensate, and curing catalyst", Sep. 6, 1994, XP-0025562.75, Database Week WP189440; AN 1994-322393.
Andou et al., "Hydrophilic Curable Composition for Coating Metals, Glass etc.—Comprises Acrylic; copolymer having alkoxy:silyl gp, tetra: alkyl silicate and/or its condensn prod and curing catalyst", May 24, 1994XP-002422490, Database WPI Week 199425; An 1994-206642.
Article of Daily Newspaper Chemical Industry, Jan. 30, 1995, and translation "Nippon Paint Developed New Polymer for Construction Paint, Reversible Between Hydrophilicity and Hydrophobicity".
European Search Report issued Jan. 20, 2010, in European Application 08004034.8, in co-pending U.S. Appl. No. 12/046,334.
European Search Report issued Jan. 4, 2010, in European Application 08004155.1, in co-pending U.S. Appl. No. 12/047,161.
Final Office Action issued Dec. 18, 2008, in U.S. Appl. No. 11/856,578.
Final Office Action issued Jun. 6, 2005, in co-pending U.S. Appl. No. 11/356,397.
Final Office Action issued Oct. 23, 2009, in co-pending U.S. Appl. No. 11/603,190.
Inoue et al., "Preparation of coating films for use as e.g. top coating film for car bodies—involves base coating using metallic powder and/or coloured pigment, . . . ", Nov. 25, 1997 , XP-002566274, Database Week WPI 199806; AN 1998-059442.
International Search Report issued Mar. 22, 2007 in PCT/JP2006/323375, corresponding to co-pending U.S. Appl. No. 12/067,607.
Non-final Office Action issued Dec. 10, 2009, in co-pending U.S. Appl. No. 12/046,334.
Non-final Office Action issued Jul. 20, 2009, in co-pending U.S. Appl. No. 12/266,412.
Non-final Office Action issued Mar. 2, 2009, in co-pending U.S. Appl. No. 11/603,190.
Non-final Office Action issued May 15, 2009, in co-pending U.S. Appl. No. 12/046,334.
Non-final Office Action issued May 19, 2009, in co-pending U.S. Appl. No. 11/856,578.
Non-final Office Action issued Nov. 29, 2007, in co-pending U.S. Appl. No. 11/356,397.
Non-final Office Action issued Dec. 10, 2009, in co-pending U.S. Appl. No. 12/046,334.
XP002908012, "Multilayered coating film to protect submersible structures from adhesion of marine organism for long period of time . . . "; Sep. 28, 1999.

* cited by examiner

HYDROPHILIC COMPOSITION AND HYDROPHILIC MEMBER

BACKGROUND OF THE INVENTION

1. Field of the Invention

The present invention relates to a hydrophilic composition useful for forming a hydrophilic film having excellent soiling resistance, fogging resistance and rapid driability in wet with water or the like and having better abrasion resistance, on the surface of various substrates, and to a hydrophilic member having a soiling-resistant and fogging-resistant surface provided with a hydrophilic film formed of the hydorpohlic composition and having excellent soiling resistance.

2. Description of the Related Art

Various techniques have been proposed for preventing adhesion of oily soil to the surface of members. In particular, optical members such as antireflection films, optical filters, optical lenses, eyeglass lenses and mirrors may be soiled with fingerprints, sebum, sweat, cosmetics and the like when used by persons, whereby their functions may lower and it is troublesome to remove the soil, and therefore it is desired to apply effective anti-soiling treatment to them.

With the recent popularization of mobiles, displays have become much used in the outdoors; but when they are used in the environment in which external light is incident thereon, they cause some problems in that the incident light may make mirror reflection on them and the reflected light may mix with the display light to make the display image difficult to see. Accordingly, an antireflective optical member is often disposed on the surface of displays.

As the antireflective optical member of the type, for example, known are a laminate of a high-refractivity layer and a low-refractivity layer; a structure having a low-refractivity layer of an inorganic or organic fluoride compound singly formed on the surface of a transparent substrate; and a structure constructed by forming a coating layer containing transparent fine particles on the surface of a transparent plastic film substrate, in which the roughened surface may thereby make irregular reflection of external light on it. Like that of the above-mentioned optical members, the surface of the antireflective optical members may be readily soiled with fingerprints, sebum and the like when used by persons, and therefore they have some problems in that the only soiled part may make high reflection thereon and the soil becomes more remarkable and, in addition, the surface of the antireflection film generally has fine projections and recesses and therefore soil removal from it is difficult.

Various techniques have been proposed for forming, on the surface of solid members, an anti-soiling function having a capability of making the surface difficult to soil and a capability of facilitating removal of the soil adhering thereto. In particular, as a combination of an antireflective member and an anti-soiling member, for example, proposed are a soiling-resistant and abrasion-resistant material having an antireflection film of essentially silicon dioxide and processed with an organosilicon substituent-having compound (e.g., see JP-A 64-86101); and a soiling-resistant and abrasion-resistant CRT filter in which the substrate surface is coated with a silanol-terminated organopolysiloxane (e.g., see JP-A 4-338901). Also proposed are an antireflection film containing a silane compound such as typically a polyfluoroalkyl group-having silane compound (e.g., see JP-B 6-29332); and a combination of a thin optical film of essentially silicon dioxide and a copolymer of a perfluoroalkyl acrylate and an alkoxysilane group-having monomer (e.g., see JP-A 7-16940).

However, the soiling-resistant layer formed according to conventional methods is insufficient in point of its soiling resistance and, in particular, soil with fingerprints, sebum, cosmetics and the like is difficult to wipe off, and the surface treatment with a material having low surface energy such as fluorine, silicon or the like is problematic in that the anti-soiling capability of the treated surface may lower with time, and therefore, it is desired to develop an anti-soiling member having excellent soiling resistance and durability.

A resin film or an inorganic material of glass, metal or the like that is generally used as the surface of optical members is generally hydrophobic or weakly hydrophilic on its surface. When the surface of a substrate formed of such a resin film or an inorganic material is hydrophilicated, then water droplets adhering thereto may uniformly spread on the substrate surface to form a uniform water film thereon, and accordingly, this may be effective for preventing glass, lenses and mirrors from fogging, and may be helpful for preventing devitrification and for securing view even in rain. Further, hydrophobic pollutants, for example, combustion products such as carbon black in city dust and exhaust gas by vehicles, and also oils and fats and ingredients released from sealants may hardly adhere to it, and even if they have adhered thereto, they may be readily removed by rain or washed away with water; and therefore the resin film and the inorganic material are useful in various applications.

Surface treatment for hydrophilication heretofore proposed, for example, etching treatment or plasma treatment enable high-level surface hydrophilication, but its effect is temporary and the hydrophilicated condition could not be kept as such for a long period of time. Also proposed is a surface-hydrophilicating coating film formed of a hydrophilic graft polymer, a type of a hydrophilic resin (e.g., see Article of Daily Newspaper Chemical Industry, Jan. 30, 1995); however, though this coating film may have hydrophilicity in some degree, its affinity to substrates is not sufficient, and a coating film having higher durability is desired.

As a film having excellent surface hydrophilicity, heretofore known is a film comprising titanium oxide. For example, disclosed is a technique of forming a photocatalyst-containing layer on the surface of a substrate, and then highly hydrophilicating the surface in accordance with the optical excitation of the photocatalyst; and it is reported that, when this technique is applied to various composite materials such as glass, lenses, mirrors, exterior materials and water supply members, then it may give excellent soiling resistance to those composite materials (e.g., see WO96/29375). However, since the hydrophilic film comprising titanium oxide does not have a sufficient film strength and since it could not exhibit its hydrophilicating effect when not subjected to optical excitation, it has a problem in that its applicable sites are limited. Accordingly, an anti-soiling member having durability and having good abrasion resistance is desired.

To solve the above-mentioned problems, the characteristics of a sol-gel organic-inorganic hybrid film have been specifically noted, and it has been found that a hydrophilic surface having a crosslinked structure formed through hydrolysis and polycondensation of a hydrophilic polymer and an alkoxide has excellent fogging resistance and soiling resistance and has good abrasion resistance (see JP-A 2002-361800). The hydrophilic surface layer having such a crosslinked structure may be readily formed by combining a specific hydrophilic polymer having a reactive group at its terminal and a crosslinking agent.

SUMMARY OF THE INVENTION

Further promoting the studies of sol-gel organic-inorganic hybrid films, an object of the invention is to develop the above-mentioned conventional art techniques and to provide a hydrophilic composition to be used in forming, on the surface of various substrates, a hydrophilic film having excellent soiling resistance, excellent fogging resistance and rapid driability in wet with water or the like and having better abrasion resistance. Another object of the invention is to provide a hydrophilic member provided with a hydrophilic film formed of the hydrophilic composition on the surface of a suitable support, and having a surface that has excellent soiling resistance, excellent fogging resistance and rapid driability in wet with water or the like and has excellent abrasion resistance and excellent scratch resistance.

We, the present inventors have further developed the studies of sol-gel organic-inorganic hybrid films, and, as a result, have found that a hydrophilic surface layer having a crosslinked structure formed through hydrolysis and polycondensation of a hydrophilic polymer and an alkoxide, may be formed on the surface of a suitable support, that the hydrophilic surface layer having such a crosslinked structure may be formed by a combination of a specific hydrophilic polymer having a reactive group in its side branch, in which the reactive group is linked to the main chain of the polymer via a highly-hydrophilic linking chain therebetween, and a crosslinking agent, and that the hydrophilic surface layer may have excellent soiling resistance and fogging resistance and rapid driability in wet with water or the like, to the same level as that in the conventional art techniques, and may realize more excellent abrasion resistance and scratch resistance. On the basis of these findings, we have completed the present invention.

A hydrophilic composition of the invention contains (A) a hydrophilic polymer represented by the following general formula (I) and (B) an alkoxide compound of an element selected from Si, Ti, Zr and Al.

Formula (I)

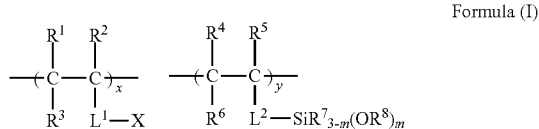

In formula (I), $R^1$ to $R^8$ each independently represents a hydrogen atom or a hydrocarbon group having 8 or less carbon atoms, $L^1$ represents a single bond or a polyvalent organic linking group, $L^2$ represents a single bond, or a polyvalent organic linking group having at least one structure selected from the group consisting of —CONH—, —NHCONH—, —OCONH—, —SO$_2$NH— and —SO$_3$—, m represents an integer of from 1 to 3, x and y each is a number of from 0 to 100 with the proviso that x+y=100, and X represents —OH, —OR$_a$, —COR$_a$, —CO$_2$R$_e$, —CON(R$_a$)(R$_b$), —N(R$_a$)(R$_b$), —NHCOR$_d$, —NHCO$_2$R$_a$, —OCON(R$_a$)(R$_b$), —NHCON(R$_a$)(R$_b$), —SO$_3$R$_e$, —OSO$_3$R$_e$, —SO$_2$R$_d$, —NHSO$_2$R$_d$, —SO$_2$N(R$_a$)(R$_b$), —N(R$_a$)(R$_b$)(R$_c$), —N(R$_a$)(R$_b$)(R$_c$)(R$_g$), —PO$_3$(R$_e$)(R$_f$), —OPO$_3$(R$_e$)(R$_f$) or —PO$_3$(R$_d$)(R$_e$), wherein R$_a$, R$_b$ and R$_c$ each independently represents a hydrogen atom or a linear, branched or cyclic alkyl group having from 1 to 8 carbon atoms, R$_d$ represents a linear, branched or cyclic alkyl group having from 1 to 8 carbon atoms, R$_e$ and R$_f$ each independently represents a hydrogen atom, or a linear, branched or cyclic alkyl group having from 1 to 8 carbon atoms, or an alkali metal, an alkaline earth metal, or an onium, R$_g$ represents a linear, branched or cyclic alkyl group having from 1 to 8 carbon atoms, or a halogen atom, an inorganic anion or an organic anion.

A hydrophilic member of the invention includes a substrate and a hydrophilic film formed by heating and drying a hydrophilic composition, wherein the hydrophilic composition contains (A) a hydrophilic polymer represented by the following general formula (I) and (B) an alkoxide compound of an element selected from Si, Ti, Zr and Al. The hydrophilic film has a crosslinked structure constructed by preparing the above hydrophilic composition and forming it into a coating film.

Formula (I)

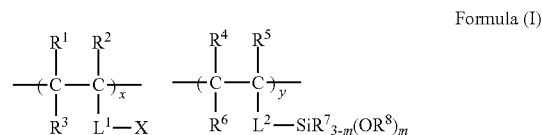

In formula (I), $R^1$ to $R^8$ each independently represents a hydrogen atom or a hydrocarbon group having 8 or less carbon atoms, $L^1$ represents a single bond or a polyvalent organic linking group, $L^2$ represents a single bond, or a polyvalent organic linking group having at least one structure selected from the group consisting of —CONH—, —NHCONH—, —OCONH—, —SO$_2$NH— and —SO$_3$—, m represents an integer of from 1 to 3, x and y each is a number of from 0 to 100 with the proviso that x+y=100, and X represents —OH, —OR$_a$, —COR$_a$, —CO$_2$R$_e$, —CON(R$_a$)(R$_b$), —N(R$_a$)(R$_b$), —NHCOR$_d$, —NHCO$_2$R$_a$, —OCON(R$_a$)(R$_b$), —NHCON(R$_a$)(R$_b$), —SO$_3$R$_e$, —OSO$_3$R$_e$, —SO$_2$R$_d$, —NHSO$_2$R$_d$, —SO$_2$N(R$_a$)(R$_b$), —N(R$_a$)(R$_b$)(R$_c$), —N(R$_a$)(R$_b$)(R$_c$)(R$_g$), —PO$_3$(R$_e$)(R$_f$), —OPO$_3$(R$_e$)(R$_f$) or —PO$_3$(R$_d$)(R$_e$), wherein R$_a$, R$_b$ and R$_c$ each independently represents a hydrogen atom or a linear, branched or cyclic alkyl group having from 1 to 8 carbon atoms, R$_d$ represents a linear, branched or cyclic alkyl group having from 1 to 8 carbon atoms, R$_e$ and R$_f$ each independently represents a hydrogen atom, or a linear, branched or cyclic alkyl group having from 1 to 8 carbon atoms, or an alkali metal, an alkaline earth metal, or an onium, R$_g$ represents a linear, branched or cyclic alkyl group having from 1 to 8 carbon atoms, or a halogen atom, an inorganic anion or an organic anion.

The hydrophilic composition of the invention, or the hydrophilic composition used in forming the hydrophilic member of the invention preferably further contains a catalyst (C), and the catalyst (C) includes a compound that promotes the reaction of the above alkoxide compound (B) of an element selected from Si, Ti, Zr and Al (hereinafter this may be referred to as "specific alkoxide"), and the hydrophilic polymer (A) of the following general formula (I) (hereinafter this may be referred to as "specific hydrophilic polymer").

Formula (I)

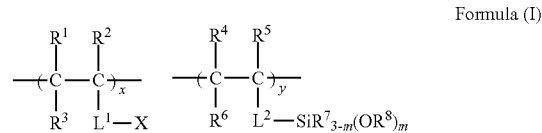

In formula (I), $R^1$ to $R^8$ each independently represents a hydrogen atom or a hydrocarbon group having 8 or less carbon atoms, $L^1$ represents a single bond or a polyvalent organic linking group, $L^2$ represents a single bond, or a polyvalent organic linking group having at least one structure selected from the group consisting of —CONH—, —NHCONH—, —OCONH—, —SO$_2$NH— and —SO$_3$—, m represents an integer of from 1 to 3, x and y each is a number of from 0 to 100 with the proviso that x+y=100, and X represents —OH, —OR$_a$, —COR$_a$, —CO$_2$R$_e$, —CON(R$_a$)(R$_b$), —N(R$_a$)(R$_b$), —NHCOR$_d$, —NHCO$_2$R$_a$, —OCON(R$_a$) (R$_b$), —NHCON(R$_a$)(R$_b$), —SO$_3$R$_e$, —OSO$_3$R$_e$, —SO$_2$R$_d$, —NHSO$_2$R$_d$, —SO$_2$N(R$_a$)(R$_b$), —N(R$_a$)(R$_b$)(R$_c$), —N(R$_a$) (R$_b$)(R$_c$)(R$_g$), —PO$_3$(R$_e$)(R$_f$), —OPO$_3$(R$_e$)(R$_f$) or —PO$_3$(R$_d$) (R$_e$), wherein R$_a$, R$_b$ and R$_c$ each independently represents a hydrogen atom or a linear, branched or cyclic alkyl group having from 1 to 8 carbon atoms, R$_d$ represents a linear, branched or cyclic alkyl group having from 1 to 8 carbon atoms, R$_e$ and R$_f$ each independently represents a hydrogen atom, or a linear, branched or cyclic alkyl group having from 1 to 8 carbon atoms, or an alkali metal, an alkaline earth metal, or an onium, R$_g$ represents a linear, branched or cyclic alkyl group having from 1 to 8 carbon atoms, or a halogen atom, an inorganic anion or an organic anion.

A hydrophilic member of the invention includes an undercoat layer that contains a nonvolatile catalyst, between the substrate and the hydrophilic film. Preferably, the undercoat layer is formed through hydrolysis and polycondensation of a composition containing at least a metal alkoxide compound of an element selected from Si, Ti, Zr and Al, and the nonvolatile catalyst. At least any of the catalyst used in the undercoat layer and the catalyst used in the hydrophilic layer may be a metal chelate compound and a silane-coupling agent, in which, more preferably, the metal chelate compound comprises a metal element selected from the Groups 2A, 3B, 4A and 5A of the Periodic Table, and an oxo or hydroxy oxygen-containing compound selected from β-diketones, ketoesters, hydroxycarboxylic acids and their esters, aminoalcohols and enol-type active hydrogen compounds, and the silane-coupling agent has an acidic or alkaline functional group.

A hydrophilic composition of the invention contains (A) a hydrophilic polymer represented by the following general formula (I):

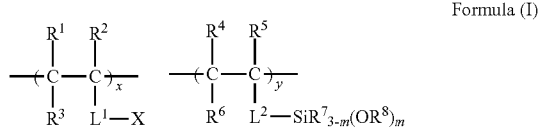

Formula (I)

In formula (I), R$^1$ to R$^8$ each independently represents a hydrogen atom or a hydrocarbon group having 8 or less carbon atoms, L$^1$ represents a single bond or a polyvalent organic linking group, L$^2$ represents a single bond, or a polyvalent organic linking group having at least one structure selected from the group consisting of —CONH—, —NHCONH—, —OCONH—, —SO$_2$NH— and —SO$_3$—, m represents an integer of from 1 to 3, x and y each is a number of from 0 to 100 with the proviso that x+y=100, and X represents —OH, —OR$_a$, —COR$_a$, —CO$_2$R$_e$, —CON(R$_a$)(R$_b$), —N(R$_a$)(R$_b$), —NHCOR$_d$, —NHCO$_2$R$_a$, —OCON(R$_a$) (R$_b$), —NHCON(R$_a$)(R$_b$), —SO$_3$R$_e$, —OSO$_3$R$_e$, —SO$_2$R$_d$, —NHSO$_2$R$_d$, —SO$_2$N(R$_a$)(R$_b$), —N(R$_a$)(R$_b$)(R$_c$), —N(R$_a$) (R$_b$)(R$_c$)(R$_g$), —PO$_3$(R$_e$)(R$_f$), —OPO$_3$(R$_e$)(R$_f$) or —PO$_3$(R$_d$) (R$_e$), wherein R$_a$, R$_b$ and R$_c$ each independently represents a hydrogen atom or a linear, branched or cyclic alkyl group having from 1 to 8 carbon atoms, R$_d$ represents a linear, branched or cyclic alkyl group having from 1 to 8 carbon atoms, R$_e$ and R$_f$ each independently represents a hydrogen atom, or a linear, branched or cyclic alkyl group having from 1 to 8 carbon atoms, or an alkali metal, an alkaline earth metal, or an onium, R$_g$ represents a linear, branched or cyclic alkyl group having from 1 to 8 carbon atoms, or a halogen atom, an inorganic anion or an organic anion.

A hydrophilic member of the invention includes a substrate and a hydrophilic film formed by heating and drying a hydrophilic composition, wherein the hydrophilic composition contains (A) a hydrophilic polymer represented by the following general formula (I).

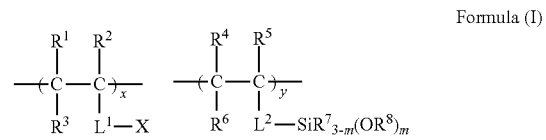

Formula (I)

In formula (I), R$^1$ to R$^8$ each independently represents a hydrogen atom or a hydrocarbon group having 8 or less carbon atoms, L$^1$ represents a single bond or a polyvalent organic linking group, L$^2$ represents a single bond, or a polyvalent organic linking group having at least one structure selected from the group consisting of —CONH—, —NHCONH—, —OCONH—, —SO$_2$NH— and —SO$_3$—, m represents an integer of from 1 to 3, x and y each is a number of from 0 to 100 with the proviso that x+y=100, and X represents —OH, —OR$_a$, —COR$_a$, —CO$_2$R$_e$, —CON(R$_a$)(R$_b$), —N(R$_a$)(R$_b$), —NHCOR$_d$, —NHCO$_2$R$_a$, —OCON(R$_a$) (R$_b$), —NHCON(R$_a$)(R$_b$), —SO$_3$R$_e$, —OSO$_3$R$_e$, —SO$_2$R$_d$, —NHSO$_2$R$_d$, —SO$_2$N(R$_a$)(R$_b$), —N(R$_a$)(R$_b$)(R$_c$), —N(R$_a$) (R$_b$)(R$_c$)(R$_g$), —PO$_3$(R$_e$)(R$_f$), —OPO$_3$(R$_e$)(R$_f$) or —PO$_3$(R$_d$) (R$_e$), wherein R$_a$, R$_b$ and R$_c$ each independently represents a hydrogen atom or a linear, branched or cyclic alkyl group having from 1 to 8 carbon atoms, R$_d$ represents a linear, branched or cyclic alkyl group having from 1 to 8 carbon atoms, R$_e$ and R$_f$ each independently represents a hydrogen atom, or a linear, branched or cyclic alkyl group having from 1 to 8 carbon atoms, or an alkali metal, an alkaline earth metal, or an onium, R$_g$ represents a linear, branched or cyclic alkyl group having from 1 to 8 carbon atoms, or a halogen atom, an inorganic anion or an organic anion.

The hydrophilic composition of the invention or the hydrophilic composition to be used for forming the hydrophilic member of invention preferably further contains (C) a catalyst. The catalyst (C) includes a compound that promotes the reaction of (A) a hydrophilic polymer of the following general formula (I) (this may be hereinafter referred to as a specific hydrophilic polymer):

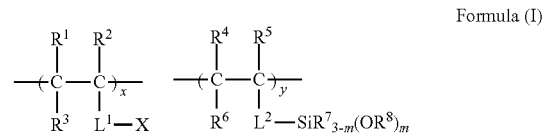

Formula (I)

In formula (I), R$^1$ to R$^8$ each independently represents a hydrogen atom or a hydrocarbon group having 8 or less carbon atoms, L$^1$ represents a single bond or a polyvalent organic linking group, L$^2$ represents a single bond, or a polyvalent organic linking group having at least one structure selected from the group consisting of —CONH—, —NHCONH—, —OCONH—, —SO$_2$NH— and —SO$_3$—, m represents an integer of from 1 to 3, x and y each is a number of from 0 to 100 with the proviso that x+y=100, and X represents —OH, —OR$_a$, —COR$_a$, —CO$_2$R$_c$, —CON(R$_a$)(R$_b$), —N(R$_a$)(R$_b$), —NHCOR$_d$, —NHCO$_2$R$_a$, —OCON(R$_a$)

$(R_b)$, —NHCON$(R_a)(R_b)$, —SO$_3$R$_e$, —OSO$_3$R$_e$, —SO$_2$R$_d$, —NHSO$_2$R$_d$, —SO$_2$N$(R_a)(R_b)$, —N$(R_a)(R_b)(R_c)$, —N$(R_a)(R_b)(R_c)(R_g)$, —PO$_3$(R$_e$)(R$_f$), —OPO$_3$(R$_e$)(R$_f$) or —PO$_3$(R$_d$)(R$_e$), wherein $R_a$, $R_b$ and $R_c$ each independently represents a hydrogen atom or a linear, branched or cyclic alkyl group having from 1 to 8 carbon atoms, $R_d$ represents a linear, branched or cyclic alkyl group having from 1 to 8 carbon atoms, $R_e$ and $R_f$ each independently represents a hydrogen atom, or a linear, branched or cyclic alkyl group having from 1 to 8 carbon atoms, or an alkali metal, an alkaline earth metal, or an onium, $R_g$ represents a linear, branched or cyclic alkyl group having from 1 to 8 carbon atoms, or a halogen atom, an inorganic anion or an organic anion.

The hydrophilic composition of invention or the hydrophilic composition to be used for forming the hydrophilic member of invention preferably contains (B) an alkoxide compound of an element selected from Si, Ti, Zr and Al (hereinafter this may be referred to as a specific alkoxide).

A hydrophilic member of the invention includes an undercoat layer that contains a nonvolatile catalyst, between the substrate and the hydrophilic film. Preferably, the undercoat layer is formed through hydrolysis and polycondensation of a composition containing at least a metal alkoxide compound of an element selected from Si, Ti, Zr and Al, and the nonvolatile catalyst. At least any of the catalyst used in the undercoat layer and the catalyst used in the hydrophilic layer may be a metal chelate compound and a silane-coupling agent, in which, more preferably, the metal chelate compound comprises a metal element selected from the Groups 2A, 3B, 4A and 5A of the Periodic Table, and an oxo or hydroxy oxygen-containing compound selected from β-diketones, ketoesters, hydroxycarboxylic acids and their esters, aminoalcohols and enol-type active hydrogen compounds, and the silane-coupling agent has an acidic or alkaline functional group.

The principle of the invention may be presumed as follows:
The hydrophilic layer having a crosslinked structure formed through hydrolysis and polycondensation of a polymer having a hydrophilic group and a silane-coupling group at its side branch and an alkoxide of all element selected from Si, Ti, Zr and Al may form an organic-inorganic hybrid film having a high-density crosslinked structure, and therefore, it may be a high-strength film. Concretely, when the specific hydrophilic polymer (A) is dissolved in a suitable solvent and stirred, then hydrolysis and polycondensation goes on in the system to give a sol-like hydrophilic composition, and when this is applied onto a substrate and dried thereon, then an organic-inorganic hybrid film may be formed on the surface of the substrate, having a hydrophilic functional group and having a crosslinked structure formed through reaction of the specific alkoxide (B) with the functional group. Further, since the composition contains the specific alkoxide (B), the reaction sites to form crosslinks through the hydrolysis and polycondensation of the silane-coupling group and the polymerizing functional group in the hydrolyzable compound in the system may increase, and therefore an organic-inorganic hybrid coating film having a tough crosslinked structure having a higher density may be formed, and accordingly, it may be considered that the coating film of the hydrophilic layer thus formed may have a further higher strength and may exhibit excellent abrasion resistance, and therefore the high surface hydrophilicity may be kept as such for a long period of time. Further, when water adheres to the surface having extremely high hydrophilicity, then it may spread widely, therefore increasing the surface area adjacent to air may increase with the result that the drying speed of the surface in wet with water or the like may be extremely high, or that is the coating film has excellent rapid driability.

In the conventional art techniques, a silane-coupling agent is introduced into the terminal of a hydrophilic polymer, and therefore, when a hydrophilic layer is formed of the hydrophilic polymer, then the polymer locally and graft-wise exists in the surface of the layer thereby increasing the degree of free motion of the polymer chain, and the affinity of the surface with water is thereby increased and the surface exhibits high hydrophilicity. In the invention, however, since a silane-coupling agent exists in the side branch of the polymer and therefore the above effect could not be expected, but rather deterioration of the hydrophilicity of the polymer film may be taken into consideration. Given that situation, it is believed that, in the invention, the silane-coupling group and the polymer main chain are linked together with a highly-hydrophilic linking group therebetween, therefore realizing the hydrophilicity on the same level as in the conventional art techniques.

In addition, since a silane-coupling agent is introduced into the side branch of the polymer, the compatibility between the inorganic component, alkoxide and the hydrophilic polymer is increased, and therefore an organic-inorganic hybrid hydrophilic layer may be obtained in which the organic component and the inorganic component are uniformly dispersed. Accordingly, it is believed that the invention gives a hydrophilic member having extremely excellent abrasion resistance.

In the invention, an undercoat layer may be effectively provided between the substrate and the hydrophilic layer. The adhesiveness between the support and the hydrophilic layer may be realized by reaction of the reactive groups both in the surface of the support and in the hydrophilic layer. In fact, when the surface of the support could not have a so much reactive group, then the hydrophilic layer may be firmly adhered to the support via the undercoat layer having a plenty of functional groups. When the undercoat layer contains a nonvolatile catalyst therein, then the catalyst does not evaporate even in the drying step of producing a hydrophilic member and may keep its activity, therefore remaining in the film formed. As a result, crosslinking reaction may further go on in the film even for a white later, and the film may thereby have an extremely high strength. Further, even in the interface between the substrate and the coating film thereon, the nonvolatile catalyst may still exist not losing its activity, and therefore the reaction between the substrate and the hydrophilic layer may further go on even for a while later, therefore capable of realizing high adhesiveness between the two.

DETAILED DESCRIPTION OF THE INVENTION

The invention is described in detail hereinunder.
The hydrophilic composition of the invention is characterized by containing (A) a hydrophilic polymer of the following formula (I) and (B) an alkoxide compound of an element selected from Si, T, Zr and Al.

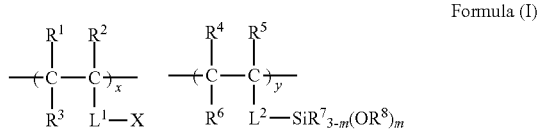

Formula (I)

In formula (I), $R^1$ to $R^8$ each independently represents a hydrogen atom or a hydrocarbon group having 8 or less carbon atoms; $L^1$ represents a single bond or a polyvalent organic linking group; $L^2$ represents a single bond, or a polyvalent organic linking group having at least one structure selected from a group consisting of —CONH—, —NH-CONH—, —OCONH—, —SO$_2$NH— and —SO$_3$—; m indicates an integer of from 1 to 3; x and y are from 0 to 100 to give a number of x+y=100; X represents —OH, —OR$_a$, —COR$_a$, —CO$_2$R$_e$, —CON(R$_a$)(R$_b$), —N(R$_a$)(R$_b$), —NHCOR$_d$, —NHCO$_2$R$_a$, —OCON(R$_a$)(R$_b$), —NHCON(R$_a$)(R$_b$), —SO$_3$R$_e$, —OSO$_3$R$_e$, —SO$_2$R$_d$, —NHSO$_2$R$_d$, —SO$_2$N(R$_a$)(R$_b$), —N(R$_a$)(R$_b$)(R$_c$), —N(R$_a$)(R$_b$)(R$_c$)(R$_g$), —PO$_3$(R$_e$)(R$_f$), —OPO$_3$(R$_e$)(R$_f$) or —PO$_3$(R$_d$)(R$_e$); R$_a$, R$_b$ and R$_c$ each independently represents a hydrogen atom or a linear, branched or cyclic alkyl group having from 1 to 8 carbon atoms; R$_d$ represents a linear, branched or cyclic alkyl group having from 1 to 8 carbon atoms; R$_e$ and R$_f$ each independently represents a hydrogen atom, or a linear, branched or cyclic alkyl group having from 1 to 8 carbon atoms, or an alkali metal, an alkaline earth metal, or an onium; R$_g$ represents a linear, branched or cyclic alkyl group having from 1 to 8 carbon atoms, or a halogen atom, an inorganic anion or an organic anion.

The components contained in the hydrophilic composition of the invention are described below.

[(A) Hydrophilic Polymer of Formula (I)]

The specific hydrophilic polymer (A) for use in the invention has structural units of the following formulae (I-a) and (I-b):

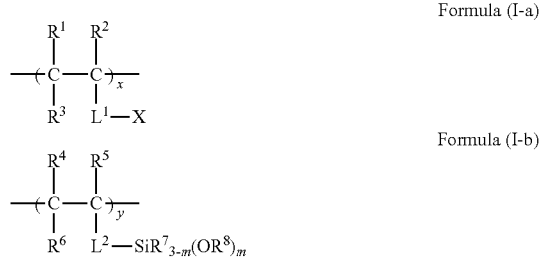

Formula (I-a)

Formula (I-b)

In formulae (I-a) and (I-b), $R^1$ to $R^8$ each independently represents a hydrogen atom or a hydrocarbon group having 8 or less carbon atoms; $L^1$ represents a single bond or a polyvalent organic linking group; $L^2$ represents a single bond, or a polyvalent organic linking group having at least one structure selected from a group consisting of —CONH—, —NH-CONH—, —OCONH—, —SO$_2$NH— and —SO$_3$—; m indicates an integer of from 1 to 3; x and y are from 0 to 100 to give a number of x+y=100; X represents —OH, —OR$_a$, —COR$_a$, —CO$_2$R$_e$, —CON(R$_a$)(R$_b$), —N(R$_a$)(R$_b$), —NHCOR$_d$, —NHCO$_2$R$_a$, —OCON(R$_a$)(R$_b$), —NHCON(R$_a$)(R$_b$), —SO$_3$R$_e$, —OSO$_3$R$_e$, —SO$_2$R$_d$, —NHSO$_2$R$_d$, —SO$_2$N(R$_a$)(R$_b$), —N(R$_a$)(R$_b$)(R$_c$), —N(R$_a$)(R$_b$)(R$_c$)(R$_g$), —PO$_3$(R$_e$)(R$_f$), —OPO$_3$(R$_e$)(R$_f$) or —PO$_3$(R$_d$)(R$_e$); R$_a$, R$_b$ and R$_c$ each independently represents a hydrogen atom or a linear, branched or cyclic alkyl group having from 1 to 8 carbon atoms; R$_d$ represents a linear, branched or cyclic alkyl group having from 1 to 8 carbon atoms; R$_e$ and R$_f$ each independently represents a hydrogen atom, or a linear, branched or cyclic alkyl group having from 1 to 8 carbon atoms, or an alkali metal, an alkaline earth metal, or an onium; R$_g$ represents a linear, branched or cyclic alkyl group having from 1 to 8 carbon atoms, or a halogen atom, an inorganic anion or an organic anion.

When $R^1$ to $R^8$ represent a hydrocarbon group, the hydrocarbon group includes an alkyl group and an aryl group, and is preferably a linear, branched or cyclic alkyl group having from 1 to 8 carbon atoms. Concretely, it includes a methyl group, an ethyl group, a propyl group, a butyl group, a pentyl group, a hexyl group, a heptyl group, an octyl group, an isopropyl group, an isobutyl group, an s-butyl group, a t-butyl group, an isopentyl group, a neopentyl group, a 1-methylbutyl group, an isohexyl group, a 2-ethylhexyl group, a 2-methylhexyl group, a cyclopentyl group.

$R^1$ to $R^8$ are preferably a hydrogen atom, a methyl group or an ethyl group from the viewpoint of the effect and the easy availability of the polymer.

These hydrocarbon groups may further have a substituent. When the alkyl group has a substituent, the substituted alkyl group is composed of a substituent and an alkylene group bonding together, in which the substituent may be a monovalent non-metallic atomic group except hydrogen. Its preferred examples are a halogen atom (—F, —Br, —Cl, —I), a hydroxyl group, an alkoxy group, an aryloxy group, a mercapto group, an alkylthio group, an arylthio group, an alkyldithio group, an aryldithio group, an amino group, an N-alkylamino group, an N,N-diarylamino group, an N-alkyl-N-arylamino group, an acyloxy group, a carbamoyloxy group, an N-alkylcarbamoyloxy group, an N-arylcarbamoyloxy group, an N,N-dialkylcarbamoyloxy group, an N,N-diarylcarbamoyloxy group, an N-alkyl-N-arylcarbamoyloxy group, an alkylsulfoxy group, an arylsulfoxy group, an acylthio group, an acylamino group, an N-alkylacylamino group, an N-arylacylamino group, an ureido group, an N'-alkylureido group, an N',N'-dialkylureido group, an N'-arylureido group, an N',N'-diarylureido group, an N'-alkyl-N'-arylureido group, an N-alkylureido group, an N-arylureido group, an N'-alkyl-N-alkylureido group, an N'-alkyl-N-arylureido group, an N',N'-dialkyl-N-alkylureido group, an N',N'-dialkyl-N-arylureido group, an N'-aryl-N-alkylureido group, an N'-aryl-N-arylureido group, an N',N'-diaryl-N-alkylureido group, an N',N'-diaryl-N-arylureido group, an N'-alkyl-N'-aryl-N-alkylureido group, an N'-alkyl-N'-aryl-N-arylureido group, an alkoxycarbonylamino group, an aryloxycarbonylamino group, an N-alkyl-N-alkoxycarbonylamino group, an N-alkyl-N-aryloxycarbonylamino group, an N-aryl-N-alkoxycarbonylamino group, an N-aryl-N-aryloxycarbonylamino group, a formyl group, an acyl group, a carboxyl group, an alkoxycarbonyl group, an aryloxycarbonyl group, a carbamoyl group, an N-alkylcarbamoyl group, an N,N-dialkylcarbamoyl group, an N-arylcarbamoyl group, an N,N-diarylcarbamoyl group, an N-alkyl-N-arylcarbamoyl group, an alkylsulfinyl group, an arylsulfinyl group, an alkylsulfonyl group, an arylsulfonyl group, a sulfo group (—SO$_3$H) and its conjugate base group (hereinafter referred to as a sulfonato group), an alkoxysulfonyl group, an aryloxysulfonyl group, a sulfinamoyl group, an N-alkylsulfinamoyl group, an N,N-dialkylsulfinamoyl group, an N-arylsulfinamoyl group, an N,N-diarylsulfinamoyl group, an N-alkyl-N-arylsulfinamoyl group, a sulfamoyl group, an N-alkylsulfamoyl group, an N,N-dialkylsulfamoyl group, an N-arylsulfamoyl group, an N,N-diarylsulfamoyl group, an N-alkyl-N-arylsulfamoyl group, a phosphono group (—PO$_3$H$_2$) and its conjugate base group (hereinafter referred to as a phosphonato group), a dialkylphosphono group (—PO$_3$(alkyl)$_2$), a diarylphosphono group (—PO$_3$(aryl)$_2$), an alkylarylphosphono group (—PO$_3$(alkyl)(aryl)), a monoalkylphosphono group (—PO$_3$H(alkyl)) and its conjugate base group (hereinafter referred to as an alkylphosphonato group), a monoarylphosphono group (—PO$_3$H(aryl)) and its conjugate base group (hereinafter referred to as an arylphosphonato group), a phosphonoxy group (—OPO$_3$H$_2$) and its conjugate base group (hereinafter referred to as a phosphonatoxy group), a dialkylphosphonoxy group (—OPO$_3$(alkyl)$_2$), a diarylphosphonoxy group (—OPO3(aryl)$_2$), an alkylarylphosphonoxy group (—OPO(alkyl)(aryl)), a monoalkylphosphonoxy group (—OPO$_3$H(alkyl)) and its conjugate base (hereinafter referred to as an alkylphosphonatoxy group), a monoarylphosphonoxy group (—OPO$_3$H(aryl)) and its conjugate base group (hereinafter referred to as an arylphosphonatoxy group), a morpholino group, a cyano group, a nitro group, an aryl group, an alkenyl group, an alkynyl group.

Examples of the alkyl group in these substituents may be the same as those mentioned hereinabove for $R^1$ to $R^8$; and examples of the aryl group include a phenyl group, a biphenyl group, a naphthyl group, a tolyl group, a xylyl group, a mesityl group, a cumenyl group, a chlorophenyl group, a bromophenyl group, a chloromethylphenyl group, a hydroxyphenyl group, a methoxyphenyl group, an ethoxyphenyl group, a phenoxyphenyl group, an acetoxyphenyl group, a benzoyloxyphenyl group, a methylthiophenyl group, a phenylthiophenyl group, a methylaminophenyl group, a dimethylaminophenyl group, an acetylaminophenyl group, a carboxyphenyl group, a methoxycarbonylphenyl group, an ethoxyphenylcarbonyl group, a phenoxycarbonylphenyl group, an N-phenylcarbamoylphenyl group, a phenyl group, a cyanophenyl group, a sulfophenyl group, a sulfonatophenyl group, a phosphonophenyl group, a phosphonatophenyl group. Examples of the alkenyl group include a vinyl group, a 1-propenyl group, a 1-butenyl group, a cinnamyl group, a 2-chloro-1-ethenyl group; and examples of the alkynyl group include an ethynyl group, a 1-propynyl group, a 1-butynyl group, a trimethylsilylethynyl group. $G^1$ in the acyl group ($G^1$CO—) includes hydrogen, and the above-mentioned alkyl group and aryl group.

Of those substituents, more preferred are a halogen atom (—F, —Br, —Cl, —I), an alkoxy group, an aryloxy group, an alkylthio group, an arylthio group, an N-alkylamino group, an N,N-dialkylamino group, an acyloxy group, an N-alkylcarbamoyloxy group, an N-arylcarbamoyloxy group, an acylamino group, a formyl group, an acyl group, a carboxyl group, an alkoxycarbonyl group, an aryloxycarbonyl group, a carbamoyl group, an N-alkylcarbamoyl group, an N,N-dialkylcarbamoyl group, an N-arylcarbamoyl group, an N-alkyl-N-arylcarbamoyl group, a sulfo group, a sulfonato group, a sulfamoyl group, an N-alkylsulfamoyl group, an N,N-dialkylsulfamoyl group, an N-arylsulfamoyl group, an N-alkyl-N-arylsulfamoyl group, a phosphono group, a phosphonato group, an dialkylphosphono group, a diarylphosphono group, a monoalkylphosphono group, an alkylphosphonato group, a monoarylphosphono group, an arylphosphonato group, a phosphonoxy group, a phosphonatoxy group, an aryl group, an alkenyl group.

On the other hand, the alkylene group of the substituted alkyl group may be a divalent organic residue derived from the above-mentioned alkyl group having from 1 to 20 carbon atoms, by removing any one hydrogen atom from it. Preferably, it is a linear alkylene group having from 1 to 12 carbon atoms, or a branched alkylene group having from 3 to 12 carbon atoms, or a cyclic alkylene group having from 5 to 10 carbon atoms. Preferred examples of the substituted alkyl group constructed by combining the substituent and the alkylene group are a chloromethyl group, a bromomethyl group, a 2-chloroethyl group, a trifluoromethyl group, a methoxymethyl group, a methoxyethoxyethyl group, an allyloxymethyl group, a phenoxymethyl group, a methylthiomethyl group, a tolylthiomethyl group, an ethylaminoethyl group, a diethylaminoproyl group, a morpholinopropyl group, an acetyloxymethyl group, a benzoyloxymethyl group, an N-cyclohexylcarbamoyloxyethyl group, an N-phenylcarbamoyloxyethyl group, an acetylaminoethyl group, an N-methylbenzoylaminopropyl group, a 2-hydroxyethyl group, a 2-hydroxypropyl group, a carboxypropyl group, a methoxycarbonylethyl group, an allyloxycarbonylbutyl group, a chlorophenoxycarbonylmethyl group, a carbamoylmethyl group, an N-methylcarbamoylethyl group, an N,N-dipropylcarbamoylmethyl group, an N-(methoxyphenyl)carbamoylethyl group, an N-methyl-N-(sulfophenyl)carbamoylmethyl group, a sulfobutyl group, a sulfonatobutyl group, a sulfamoylbutyl group, an N-ethylsulfamoylmethyl group, an N,N-dipropylsulfamoylpropyl group, an N-tolylsulfamoylpropyl group, an N-methyl-N-(phosphonophenyl)sulfamoyloctyl group, a phosphonobutyl group, a phosphonatohexyl group, a diethylphosphonobutyl group, a diphenylphosphonopropyl group, a methylphosphonobutyl group, a methylphosphonatobutyl group, a tolylphosphonohexyl group, a tolylphosphonatohexyl group, a phosphonoxypropyl group, a phosphonatoxybutyl group, a benzyl group, a phenethyl group, an α-methylbenzyl group, a 1-methyl-1-phenylethyl group, a p-methylbenzyl group, a cinnamyl group, an allyl group, a 1-propenylmethyl group, a 2-butenyl group, a 2-methylallyl group, a 2-methylpropenylmethyl group, a 2-propynyl group, a 2-butynyl group, a 3-butynyl group.

$L^1$ represents a single bond or a polyvalent organic linking group. The single bond means that the polymer main chain directly bonds to the X with no linking chain therebetween. The organic linking group is a linking group comprising nonmetallic atoms. Concretely, it may comprise from 0 to 200 carbon atoms, from 0 to 150 nitrogen atoms, from 0 to 200 oxygen atoms, from 0 to 400 hydrogen atoms, and from 0 to 100 sulfur atoms. More concrete examples of the linking group are the following structural units and their combinations.

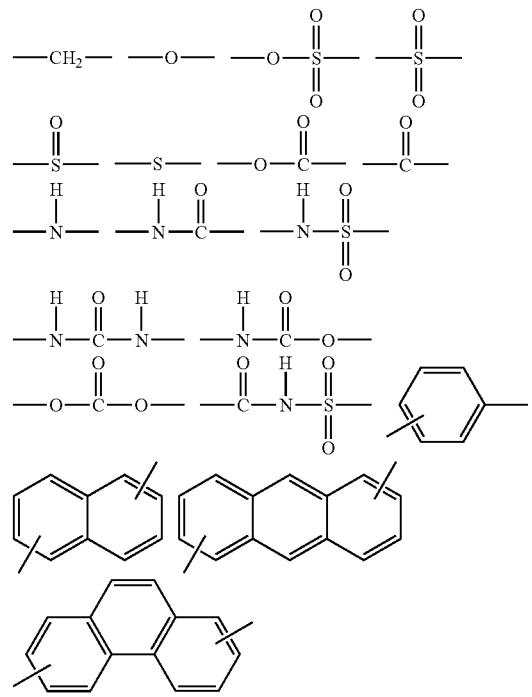

$L^1$ may be formed of a polymer or an oligomer. Concretely, it preferably includes polyacrylate, polymethacrylate, polyacrylonitrile, polyvinyl, polystyrene or the like of an unsaturated double bond-type monomer. Its other preferred examples are poly(oxyalkylene), polyurethane, polyurea, polyester, polyamide, polyimide, polycarbonate, polyamic acid, polysiloxane. More preferred are polyacrylate, polymethacrylate, polyacrylonitrile, polyvinyl, polystyrene; and even more preferred are polyacrylate, polymethacrylate.

The polymer and the oligomer may comprise one or more different types of structural units. In case where $L^1$ is a polymer or oligomer, the number of the elements constituting it is not specifically limited. Its molecular weight is preferably from 1,000 to 1,000,000, more preferably from 1,000 to 500,000, most preferably from 1,000 to 200,000.

$L^2$ represents a single bond, or a polyvalent organic linking group having at least one structure selected from a group consisting of —CONH—, —NHCONH—, —OCONH—, —SO$_2$NH— and —SO$_3$—. The single bond means that the polymer main chain directly bonds to the Si atom with no linking group therebetween. $L^2$ may have two or more structures mentioned above, in which the structures may be the same or different. When it has at least one structure, the other structure therein may be the same as that mentioned hereinabove for $L^1$.

X represents a hydrophilic group, including —OH, —OR$_a$, —COR$_a$, —CO$_2$R$_c$, —CON(R$_a$)(R$_b$), —N(R$_a$)(R$_b$), —NH-COR$_d$, —NHCO$_2$R$_a$, —OCON(R$_a$)(R$_b$), —NHCON(R$_a$)(R$_b$), —SO$_3$R$_e$, —OSO$_3$R$_e$, —SO$_2$R$_d$, —NHSO$_2$R$_d$, —SO$_2$N(R$_a$)(R$_b$), —N(R$_a$)(R$_b$)(R$_c$), —N(R$_a$)(R$_b$)(R$_c$)(R$_g$), —PO$_3$(R$_e$)(R$_f$), —OPO$_3$(R$_e$)(R$_f$) or —PO$_3$(R$_d$)(R$_e$). R$_a$, R$_b$ and R$_c$ each independently represents a hydrogen atom or a linear, branched or cyclic alkyl group having from 1 to 8 carbon atoms; R$_d$ represents a linear, branched or cyclic alkyl group having from 1 to 8 carbon atoms; R$_e$ and R$_f$ each independently represents a hydrogen atom, or a linear, branched or cyclic alkyl group having from 1 to 8 carbon atoms, or an alkali metal, an alkaline earth metal, or an onium; R$_g$ represents a linear, branched or cyclic alkyl group having from 1 to 8 carbon atoms, or a halogen atom, an inorganic anion or an organic anion. In —CON(R$_a$)(R$_b$), —OCON(R$_a$)(R$_b$), —NHCON(R$_a$)(R$_b$), —SO$_2$N(R$_a$)(R$_b$), —PO$_3$(R$_e$)(R$_f$), —OPO$_3$(R$_e$)(R$_f$), —PO$_2$(R$_d$)(R$_e$), —N(R$_a$)(R$_b$)(R$_c$) to —N(R$_a$)(R$_b$)(R$_c$)(R$_g$), R$_a$ to R$_b$ may bond to each other to form a ring, and the formed ring may be a hetero ring containing a hetero atom of an oxygen atom, a sulfur atom and a nitrogen atom. R$_a$ to R$_g$ may further have a substituent, and the substituent introducible into them may be the same as those mentioned hereinabove for the alkyl group for $R^1$ to $R^8$.

Concretely, preferred examples of R$_a$, R$_b$ and R$_c$ are a hydrogen atom, a methyl group, an ethyl group, a propyl group, a butyl group, a pentyl group, a hexyl group, a heptyl group, an octyl group, an isopropyl group, an isobutyl group, an s-butyl group, a t-butyl group, an isopentyl group, a neopentyl group, a 1-methylbutyl group, an isohexyl group, a 2-ethylhexyl group, a 2-methylhexyl group, a cyclopentyl group.

Concretely, preferred examples of R$_d$ are a methyl group, an ethyl group, a propyl group, a butyl group, a pentyl group, a hexyl group, a heptyl group, an octyl group, an isopropyl group, an isobutyl group, an s-butyl group, a t-butyl group, an isopentyl group, a neopentyl group, a 1-methylbutyl group, an isohexyl group, a 2-ethylhexyl group, a 2-methylhexyl group, a cyclopentyl group.

Concretely, R$_e$ and R$_f$ includes, in addition to the alkyl group mentioned hereinabove for R$_a$ to R$_d$, a hydrogen atom, an alkali metal such as lithium, sodium, potassium; an alkaline earth metal such as calcium, barium; and an onium such as ammonium, iodonium, sulfonium.

Concretely, R$_g$ includes, in addition to the alkyl group mentioned hereinabove for R$_a$ to R$_d$, a hydrogen atom; a halogen atom such as a fluorine atom, a chlorine atom, a bromine atom; an inorganic anion such as a nitrate anion, a sulfate anion, a tetrafluoroborate anion, a hexafluorophosphate anion; and an organic anion such as a methanesulfonate anion, a trifluoromethanesulfonate anion, a nonafluorobutanesulfonate anion, a p-toluenesulfonate anion.

Concretely, preferred examples of X are —CO$_2$—Na$^+$, —CONH$_2$, —SO$_3$—Na$^+$, —SO$_2$NH$_2$, —PO$_3$H$_2$.

x and y indicate the polymerization ratio by mol of the constitutive unit of formula (I-a) and the constitutive unit of formula (I-b) in (A) the specific hydrophilic polymer. x and y are from 0 to 100 to give a number of x+y=100. The polymerization molar ratio x/y is preferably within a range of from 99/1 to 10/90, more preferably within a range of from 99/1 to 50/50.

All the constitutive units (I-a) and (I-b) that constitute the polymer chain may be the same, or they may contain plural different constitutive units. In these cases, it is desirable that the polymerization molar ratio of the structural unit corresponding to formula (I-a) and the structural unit corresponding to formula (I-b) falls within the above range.

The molecular weight of the specific hydrophilic polymer (A) is preferably from 1,000 to 1,000,000, more preferably from 1,000 to 500,000, most preferably from 1,000 to 200,000.

Examples of the specific hydrophilic polymer (A) [Compounds (1) to (50)] are shown below along with their mass-average molecular weight (M. W.), to which, however, the invention should not be limited. The polymers of the following examples are random copolymers that contain the constitutive units shown below, in the molar ratio shown below.

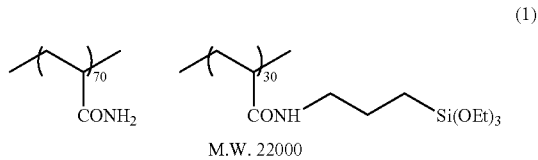

(1)

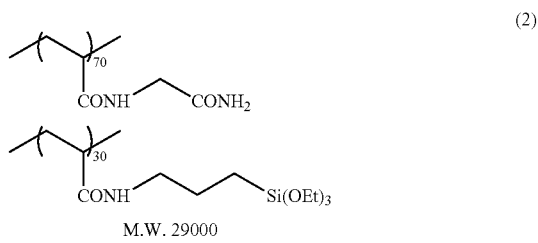

(2)

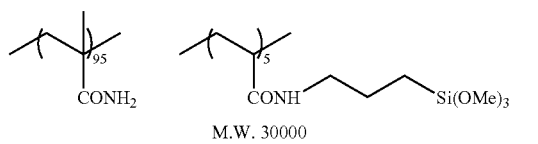

(3)

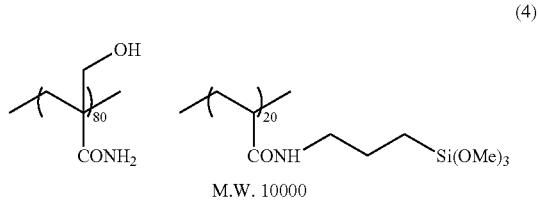

(4)

-continued (5)

![Structure 5: copolymer with 90 units of -NHCOMe and 20 units of -CONH-(CH2)3-Si(OEt)3]
M.W. 20000

(6)

![Structure 6: copolymer with 95 units of -CON(CH3)2 and 5 units of -CONH-(CH2)3-Si(OMe)3]
M.W. 19000

(7)

![Structure 7: copolymer with 85 units of -CONH(CH2CH2OH) and 15 units of -CONH-(CH2)3-Si(OMe)3]
M.W. 30000

(8)

![Structure 8: copolymer with 94 units of N-vinyl pyrrolidone and 6 units of -CONH-(CH2)3-Si(OMe)3]
M.W. 27000

(9)

![Structure 9: copolymer with 85 units of -CO2-(CH2)3-SO3K and 15 units of -CONH-(CH2)3-Si(OMe)3]
M.W. 20000

(10)

![Structure 10: copolymer with 94 units of phenyl-SO3Na and 6 units of -CONH-(CH2)3-Si(OMe)3]
M.W. 25000

(11)

![Structure 11: copolymer with 80 units of -CONH2 and 20 units of -Si(OMe)3]
M.W. 6000

(12)

![Structure 12: copolymer with 90 units of -CONH2 and 10 units of -Si(OMe)3]
M.W. 7900

(13)

![Structure 13: copolymer with 75 units of -CONH2 (with OH) and 25 units of -Si(OMe)3]
M.W. 9000

(14)

![Structure 14: copolymer with 85 units of -NHCOMe and 15 units of -Si(OMe)3]
M.W. 8600

(15)

![Structure 15: copolymer with 70 units of -CON(CH3)2 and 30 units of -Si(OMe)3]
M.W. 10000

(16)

![Structure 16: copolymer with 84 units of -CONH(CH2OH) and 16 units of -Si(OMe)3]
M.W. 15000

(17)

![Structure 17: copolymer with 88 units of -CONH(CH2CH2OH) and 12 units of -Si(OMe)3]
M.W. 30000

(18)

![Structure 18: copolymer with 90 units of -CO2-(CH2)3-SO3K and 10 units of -Si(OMe)3]
M.W. 50000

(19)

![Structure 19: copolymer with 80 units of -CO2-C(CH3)2-CH2-SO3Na and 10 units of -Si(OMe)3]
M.W. 36000

(20)

![Structure 20: copolymer with 90 units of -CO2-(CH2)2-PO2(OH) and 10 units of -Si(OMe)3]
M.W. 28000

(21)

![Structure 21: terpolymer with 90 units of -CONH2 and 10 units of -CONH-(CH2)2-OCONH-(CH2)3-Si(OEt)3]
M.W. 15000

(22)

![Structure 22: terpolymer with 95 units of -CONH2 and 5 units of -CONH-(CH2)2-OCONH-(CH2)3-Si(OEt)3]
M.W. 20000

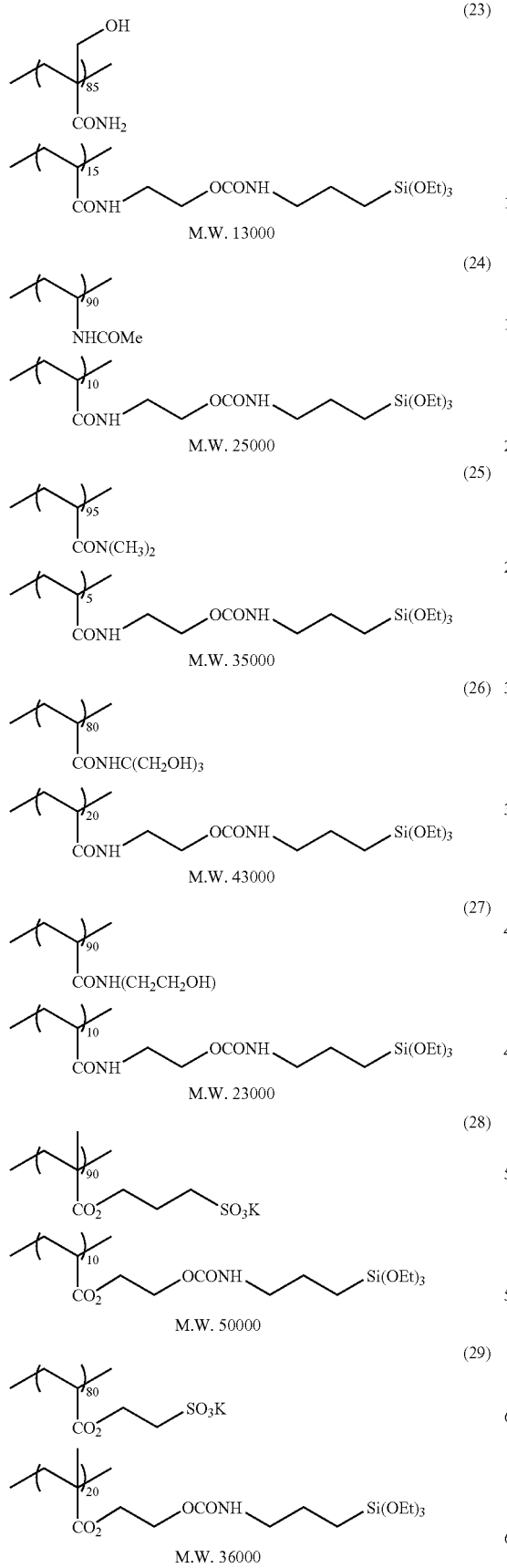
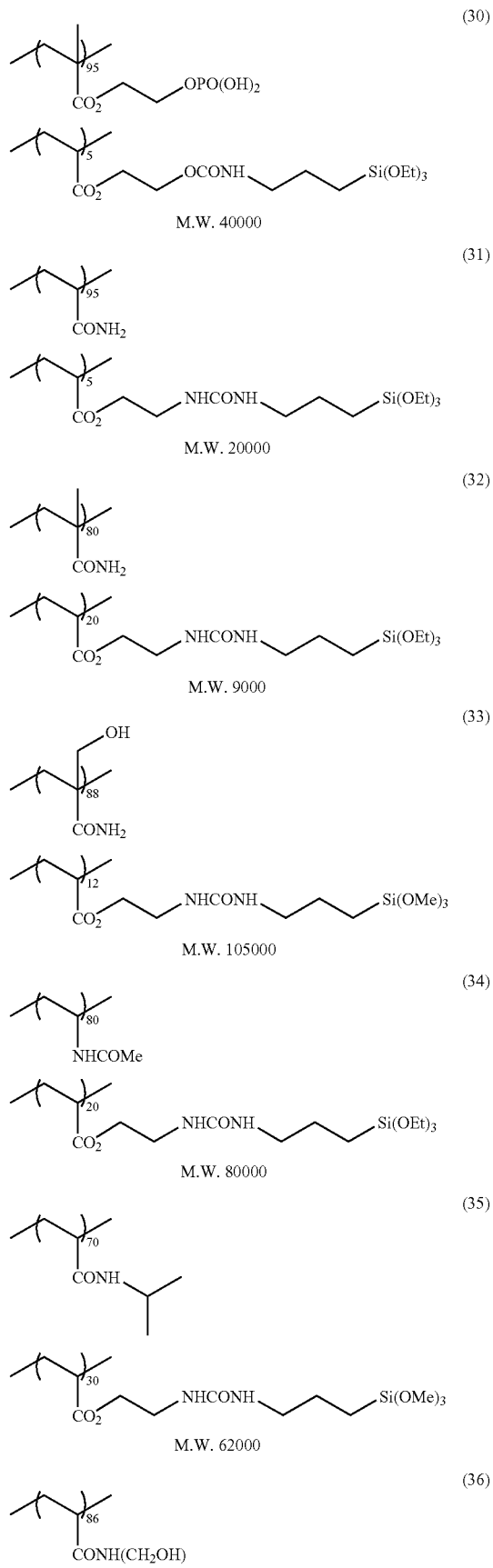

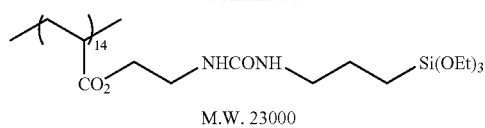
M.W. 23000
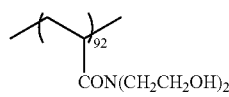
M.W. 39000
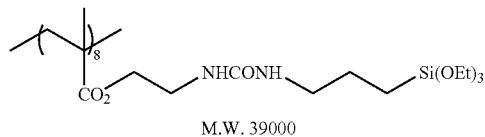
M.W. 20000
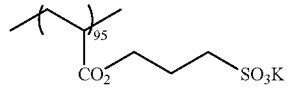
M.W. 11000
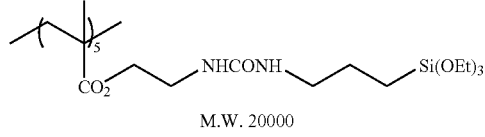
M.W. 70000
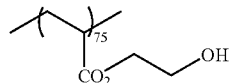
M.W. 30000
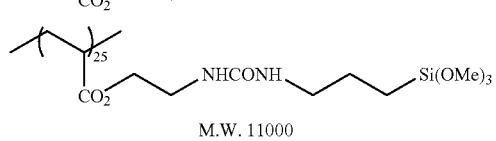
M.W. 15000
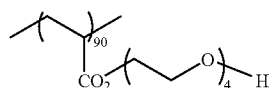
M.W. 25000
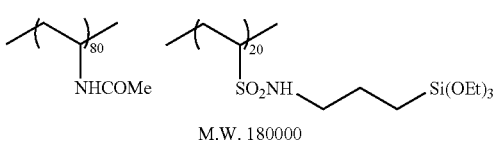
M.W. 180000
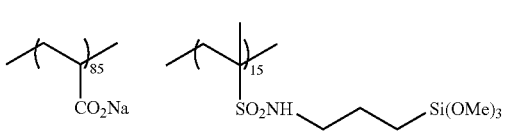
M.W. 52000
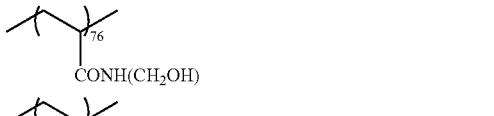
M.W. 25000
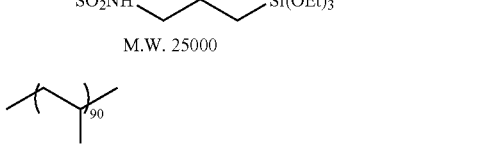
M.W. 60000
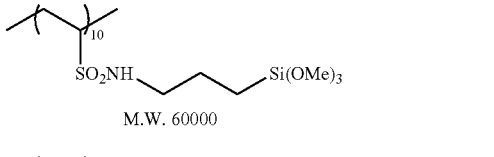
M.W. 8000
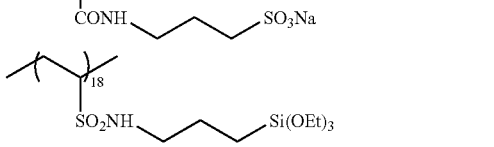
M.W. 200000
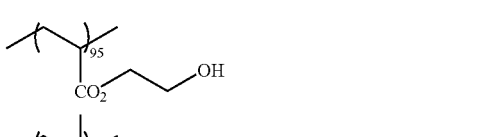
M.W. 97000
The above-mentioned compounds for producing the specific hydrophilic polymer (A) in the invention are commercially available, or may be readily produced.

Regarding the radical polymerization method for producing the specific hydrophilic polymer (A), any known method is employable for it. Concretely, general radical polymerization methods are described, for example, in New Polymer Experimental Science 3, Polymer Synthesis and Reaction 1 (edited by the Polymer Society of Japan, Kyoritsu Publishing), Lecture of New Experimental Chemistry 19, Polymer Chemistry (I) (edited by the Chemical Society of Japan, Maruzen), Lecture of Substance Engineering, Polymer Synthesis Chemistry (Tokyo Denki University Press), and these may apply to the invention.

The above specific hydrophilic polymer may also be a copolymer with any other monomer, as described below. The other usable monomer may be any known monomer including, for example, acrylates, methacrylates, acrylamides, methacrylamides, vinyl esters, styrenes, acrylic acid, methacrylic acid, acrylonitrile, maleic acid, maleimide. Copolymerization with such monomer may improve various physical properties of the composition, such as the film formability, the film strength, the hydrophilicity, the hydrophobicity, the solubility, the reactivity and the stability thereof.

Examples of the acrylates are methyl acrylate, ethyl acrylate, (n- or i-)propyl acrylate, (n-, i-, sec- or t-)butyl acrylate, amyl acrylate, 2-ethylhexyl acrylate, dodecyl acrylate, chloroethyl acrylate, 2-hydroxyethyl acrylate, 2-hydroxypropyl acrylate, 2-hydroxypentyl acrylate, cyclohexyl acrylate, allyl acrylate, trimethylolpropane monoacrylate, pentaerythritol monoacrylate, benzyl acrylate, methoxybenzyl acrylate, chlorobenzyl acrylate, hydroxybenzyl acrylate, hydroxyphenethyl acrylate, dihydroxyphenethyl acrylate, furfuryl acrylate, tetrahydrofurfuryl acrylate, phenyl acrylate, hydroxyphenyl acrylate, chlorophenyl acrylate, sulfamoylphenyl acrylate, 2-(hydroxyphenylcarbonyloxy)ethyl acrylate.

Examples of the methacrylates are methyl methacrylate, ethyl methacrylate, (n- or i-)propyl methacrylate, (n-, i-, sec- or t-)butyl methacrylate, amyl methacrylate, 2-ethylhexyl methacrylate, dodecyl methacrylate, chloroethyl methacrylate, 2-hydroxyethyl methacrylate, 2-hydroxypropyl methacrylate, 2-hydroxypentyl methacrylate, cyclohexyl methacrylate, allyl methacrylate, trimethylolpropane monomethacrylate, pentaerythritol monomethacrylate, benzyl methacrylate, methoxybenzyl methacrylate, chlorobenzyl methacrylate, hydroxybenzyl methacrylate, hydroxyphenethyl methacrylate, dihydroxyphenethyl methacrylate, furfuryl methacrylate, tetrahydrofurfuryl methacrylate, phenyl methacrylate, hydroxyphenyl methacrylate, chlorophenyl methacrylate, sulfamoylphenyl methacrylate, 2-(hydroxyphenylcarbonyloxy)ethyl methacrylate.

Examples of the acrylamides are acrylamide, N-methylacrylamide, N-ethylacrylamide, N-propylacrylamide, N-butylacrylamide, N-benzylacrylamide, N-hydroxyethylacrylamide, N-phenylacrylamide, N-tolylacrylamide, N-(hydroxyphenyl)acrylamide, N-(sulfamoylphenyl)acrylamide, N-(phenylsulfonyl)acrylamide, N-(tolylsulfonyl)acrylamide, N,N-dimethylacrylamide, N-methyl-N-phenylacrylamide, N-hydroxyethyl-N-methylacrylamide.

Examples of methacrylamides are methacrylamide, N-methylmethacrylamide, N-ethylmethacrylamide, N-propylmethacrylamide, N-butylmethacrylamide, N-benzylmethacrylamide, N-hydroxyethylmethacrylamide, N-phenylmethacrylamide, N-tolylmethacrylamide, N-(hydroxyphenyl)methacrylamide, N-(sulfamoylphenyl)methacrylamide, N-(phenylsulfonyl)methacrylamide, N-(tolylsulfonyl)methacrylamide, N,N-dimethylmethacrylamide, N-methyl-N-phenylmethacrylamide, N-hydroxyethyl-N-methylmethacrylamide.

Examples of the vinyl esters are vinyl acetate, vinyl butyrate, vinyl benzoate.

Examples of the styrenes are styrene, methylstyrene, dimethylstyrene, trimethylstyrene, ethylstyrene, propylstyrene, cyclohexylstyrene, chloromethylstyrene, trifluoromethylstyrene, ethoxymethylstyrene, acetoxymethylstyrene, methoxystyrene, dimethoxystyrene, chlorostyrene, dichlorostyrene, bromostyrene, iodostyrene, fluorostyrene, carboxystyrene.

The proportion of the other monomer to be used in producing the copolymer must be a sufficient amount enough to improve the physical properties of the copolymer. Preferably, however, the proportion is not so large in order that the hydrophilic film may have a sufficient function and it may sufficiently enjoy the advantage of adding the specific hydrophilic polymer (A) to the film composition. Accordingly, the overall proportion of the other monomer to the specific hydrophilic polymer (A) is preferably at most 80% by mass, more preferably at most 50% by mass.

In the invention, the specific hydrophilic polymer (A) may be in the hydrophilic composition in an amount falling within a range of from 5 to 95% by mass relative to the nonvolatile component therein, more preferably from 15 to 90% by mass, most preferably from 20 to 85% by mass, from the viewpoint of the curability and the hydrophilicity of the composition. One or more such polymers may be used herein either singly or as combined. The nonvolatile component as referred to herein is meant to indicate the component except the volatile solvent in the composition. [(B) Alkoxide compound of element selected from Si, Ti, Zr, Al]

The specific alkoxide (B) for use in the invention, or that is, an alkoxide compound of an element selected from Si, Ti, Zr and Al is a hydrolyzing polymerizing compound having a polymerizing functional group in its structure and serving as a crosslinking agent. Through polycondensation with the specific hydrophilic polymer (A), this forms a strong coating film having a crosslinked structure.

The specific alkoxide (B) is preferably a compound of the following general formula (III). For forming a crosslinked structure to cure the hydrophilic film formed, the specific alkoxide (B) of formula (III) is mixed with the above specific hydrophilic polymer (A), and the resulting mixture is applied onto the surface of a substrate, and heated and dried thereon.

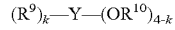

$$(R^9)_k\text{—}Y\text{—}(OR^{10})_{4-k} \quad \text{Formula (II)}$$

In formula (II), $R^9$ represents a hydrogen atom, an alkyl group or an aryl group; $R^{10}$ represents an alkyl group or an aryl group; Y represents Si, Al, Ti or Zr; k indicates an integer of from 0 to 2. The alkyl group for $R^9$ and $R^{10}$ preferably has from 1 to 4 carbon atoms. The alkyl group and the aryl group may have a substituent. The substituent capable of being introduced into them includes a halogen atom, an amino group, a mercapto group. The compound is a low-molecular compound, and preferably has a molecular weight of at most 1000.

Examples of the specific alkoxide (B) of formula (II) are mentioned below, to which, however, the invention should not be limited. Those where Y is Si, or that is, the specific alkoxides containing silicon include, for example, trimethoxysilane, triethoxysilane, tripropoxysilane, tetramethoxysilane, tetraethoxysilane, tetrapropoxysilane, methyltrimethoxysilane, ethyltrimethoxysilane, propyltrimethoxysilane, methyltriethoxysilane, ethyltriethoxysilane, propyltriethoxysilane, dimethyldimethoxysilane, diethyldiethoxysilane, γ-chloropropyltriethoxysilane, γ-mercaptopropyltrimethoxysilane, γ-mercaptopropyltriethoxysilane, γ-aminopropyltriethoxysilane, phenyltrimethoxysilane, phenyltriethoxysilane, phenyltripropoxysilane, diphenyldimethoxysilane, diphenyldiethoxysilane. Of those, especially preferred are tetramethoxysilane, tetraethoxysilane, methyltrimethoxysilane, ethyltrimethoxysilane, methyltriethoxysilane, ethyltriethoxysilane, dimethyldiethoxysilane, phenyltrimethoxysilane, phenyltriethoxysilane, diphenyldimethoxysilane, diphenyldiethoxysilane.

Those where Y is Al, or that is, the specific alkoxides containing aluminium include, for example, trimethoxyaluminate, triethoxyaluminate, tripropoxyaluminate, tetraethoxyaluminate.

Those where Y is Ti, or that is, the specific alkoxides containing titanium include, for example, trimethoxytitanate, tetramethoxytitanate, triethoxytitanate, tetraethoxytitanate, tetrapropoxytitanate, chlorotrimethoxytitanate, chlorotriethoxytitanate, ethyltrimethoxytitanate, methyltriethoxytitanate, ethyltriethoxytitanate, diethyldiethoxytitanate, phenyltrimethoxytitanate, phenyltriethoxytitanate.

Those where Y is Zr, or that is, the specific alkoxides containing zirconium include, for example zirconates that correspond to the compounds exemplified hereinabove for those containing titanium.

Of the above, preferred are alkoxides where Y is Si from the viewpoint of the film forming capability of the composition.

One or more of the specific alkoxides (B) may be used in the invention, either singly or as combined.

The specific alkoxide (B) may be in the hydrophilic composition of the invention preferably in an amount falling within a range of from 5 to 80% by mass relative to the nonvolatile component therein, more preferably within a range of from 10 to 70% by mass.

The specific alkoxide is commercially available, or may be produced in a known production method, for example, by reacting a metal chloride with an alcohol.

[Catalyst (C)]

In the hydrophilic composition of the invention, the specific hydrophilic polymer (A) and the crosslinking component such as the specific alkoxide (B) are dissolved and well stirred in a solvent, in which these components are hydrolyzed and polycondensed to form an organic-inorganic hybrid sol liquid, and the sol liquid has good hydrophilicity and may form a hydrophilic film having a high film strength. In preparing the organic-inorganic hybrid sol liquid, it is desirable to add an acid catalyst or basic catalyst to the composition for promoting the hydrolysis and polycondensation. In order to attain a practically favorable reaction efficiency, it is desirable to add the catalyst (C) to the composition.

For the catalyst (C) for use in the invention, selected is a catalyst capable of promoting the reaction of hydrolysis and polycondensation of the above alkoxide compound (B) to induce the bonding thereof to the specific hydrophilic polymer (A). For it for example, an acid or a basic compound may be used directly as it is, or a solution prepared by dissolving an acid or a basic compound in a solvent such as water or alcohol (hereinafter this may be generically referred to as an acid catalyst and a basic catalyst) may be used. The concentration of the acid or the basic compound to be dissolved in a solvent is not specifically defined, and may be suitably determined depending on the characteristics of the acid or the basic compound used and on the desired content of the catalyst. In case where the concentration of the acid or the basic compound that constitutes the catalyst is high, the hydrolysis and polycondensation speed may be high. However, when a basic catalyst having a high concentration is sued, then a deposit may form in the sol liquid. Therefore, in case where a basic catalyst is used, its concentration is preferably at most 1 N in terms of the concentration thereof in its aqueous solution.

The type of the acid catalyst and the basic catalyst is not specifically defined. When a catalyst having a high concentration must be used, then the catalyst is preferably composed of elements that remain little in the coating film after dried. Concretely, the acid catalyst includes hydrogen halides such as hydrochloric acid; nitric acid, sulfuric acid, sulfurous acid, hydrogen sulfide, perchloric acid, hydrogen peroxide, carbonic acid; carboxylic acids such as formic acid, acetic acid; substituted carboxylic acids of a structural formula RCOOH in which R is substituted with any other element or substituent; and sulfonic acids such as benzenesulfonic acid. The basic catalyst includes ammoniac bases such as aqueous ammonia; and amines such as ethylamine and aniline.

A Lewis acid catalyst of a metal complex is also preferably used herein. Especially preferred is a metal complex catalyst that comprises a metal element selected from the Groups 2A, 3B, 4A and 5A of the Periodic Table, and an oxo or hydroxy oxygen-containing compound selected from β-diketones, ketoesters, hydroxycarboxylic acids and their esters, aminoalcohols and enol-type active hydrogen compounds.

As the constitutive metal element, preferred are elements of Group 2A such as Mg, Ca, St, Ba; elements of Group 3B such as Al, Ga; elements of Group 4A such as Ti, Zr; and elements of Group 5A such as V, Nb, Ta. The metal element of the type may form a complex having an excellent catalytic effect. Of those, more preferred are complexes with Zr, Al or Ti, as they are excellent.

The oxo or hydroxy oxygen-containing compound that constitutes the ligand of the above metal complex usable in the invention includes β-diketones such as acetylacetone (2,4-pentanedione), 2,4-heptanedione; ketoesters such as methyl acetacetate, ethyl acetacetate, butyl acetacetate; hydroxycarboxylic acids and their esters such as lactic acid, methyl lactate, salicylic acid, ethyl salicylate, phenyl salicylate, malic acid, tartaric acid, methyl tartrate; ketoalcohols such as 4-hydroxy-4-methyl-2-pentanone, 4-hydroxy-2-pentanone, 4-hydroxy-4-methyl-2-heptanone, 4-hydroxy-2-heptanone; aminoalcohols such as monoethanolamine, N,N-dimethylethanolamine, N-methyl-monoethanolamine, diethanolamine, triethanolamine; enol-type active compounds such as methylolmelamine, methylolurea, methylolacrylamide, diethyl malonate; and compounds derived from acetylacetone (2,4-pentanedione) by introducing a substituent into the methyl group, the methylene group or the carbonyl carbon thereof.

Acetylacetone derivatives are preferred for the ligand. In the invention, acetylacetone derivatives are meant to indicate compounds derived from acetylacetone by introducing a substituent into the methyl group, the methylene group or the carbonyl carbon thereof. The substituent capable of being introduced into the methyl group of acetylacetone includes an alkyl group, an acyl group, a hydroxyalkyl group, a carboxyalkyl group, an alkoxy group and an alkoxyalkyl group, which may be linear or branched and have from 1 to 3 carbon atoms. The substituent capable of being introduced into the methylene group of acetylacetone includes a carboxyl group, and a carboxyalkyl group and a hydroxyalkyl group which may be linear or branched and have from 1 to 3 carbon atoms. The substituent capable of being introduced into the carbonyl carbon of acetylacetone may be an alkyl group having from 1 to 3 carbon atoms, and in this case, a hydrogen atom may be added to the carbonyl oxygen to form a hydroxyl group.

Preferred examples of the acetylacetone derivative are acetylacetone, ethylcarbonylacetone, n-propylcarbonylacetone, i-propylcarbonylacetone, diacetylacetone, 1-acetyl-1-propionyl-acetylacetone, hydroxyethylcarbonylacetone, hydroxypropylcarbonylacetone, acetacetic acid, acetopropionic acid, diacetacetic acid, 3,3-diacetopropionic acid, 4,4-diacetobutyric acid, carboxyethylcarbonylacetone, carboxypropylcarbonylacetone, diacetonalcohol. Of those, especially preferred are acetylacetone and diacetylacetone. The complex of the above acetylacetone derivative and the above metal element is a mononuclear complex having from 1 to 4 molecular ligands of the acetylacetone derivative per one metal element therein. In case where the number of the coordinable chemical bonds of the metal element is larger than the total number of the coordinable chemical bonds of the acetylacetone derivative, then any ordinary ligand generally used in ordinary complexes, such as water molecule, halide ion, nitro group or ammonio group, may be coordinated in the complex.

Preferred examples of the metal complex are tris(acetylacetonato)aluminium complex, di(acetylacetonato)aluminium/aquo-complex, mono(acetylacetonato)aluminium/chloro complex, di(diacetylacetonato)aluminium complex, ethylacetacetate aluminium diisopropylate, aluminium tris(ethylacetacetate), cyclic aluminium oxide isopropylate, tris(acetylacetonato)barium complex, di(acetylacetonato)titanium complex, tris(acetylacetonato)titanium complex, di-i-propoxy/bis(acetylacetonato)titanium complex, zirconium tris(ethylacetacetate), zirconium tris(benzoic acid) complex. These have excellent stability in water-base coating liquids and have an excellent gellation-promoting effect in sol-gel reaction in beating and drying. Of those, especially preferred are ethylacetacetate aluminium diisopropylate, aluminium tris(ethylacetacetate), di(acetylacetonato)titanium complex, zirconium tris(ethylacetacetate).

Description of the counter salt of the above-mentioned metal complex is omitted in this specification. Regarding its type, the counter salt may be any water-soluble salt capable of keeping the charge of the complex compound neutral. For example, it includes nitrates, hydrohalides, sulfates, phosphates and the like capable of securing stoichiometric neutrality of the complex.

The behavior of the metal complex in silica sol-gel reaction is described in detail in J. Sol-Gel, Sci. and Tec., 16, 209 (1999). For its reaction mechanism, the following scheme may be presumed. Specifically, in a coating liquid, the metal complex is stable, as having a coordination structure. In the dehydrating condensation reaction that starts in the heating and drying step after coating, the metal complex may promote crosslinking, like an acid catalyst. Anyhow, when the metal complex is used, then the time-dependent stability of the coating liquid and the film surface quality are improved, and the formed film satisfies both high hydrophilicity and high durability.

The above metal complex catalyst is readily available as commercial products, or may be produced in any known production method of, for example, reaction of a metal chloride and an alcohol.

The catalyst (C) may be in the hydrophilic composition of the invention preferably in an amount falling within a range of from 0 to 50% by mass relative to the nonvolatile component therein, more preferably within a range of from 5 to 25% by mass. One or more different types of the catalyst (C) may be in the composition, either singly or as combined.

In addition to the above-mentioned indispensable ingredients (A) and (B), and the optional catalyst (C) that may be therein, the hydrophilic composition of the invention may further contain any other various compounds in accordance with its object, not detracting from the effect of the invention. The additional ingredients are described below.

[Surfactant]

In the invention, a surfactant is preferably used for improving the quality of the film of the hydrophilic composition. The surfactant includes nonionic surfactants, anionic surfactants, cationic surfactants, ampholytic surfactants and fluorine-containing surfactants.

Not specifically defined, the nonionic surfactants usable in the invention may be any known ones. For example, they include polyoxyethylene alkyl ethers, polyoxyethylene alkylphenyl ethers, polyoxyethylene polystyrylphenyl ethers, polyoxyethylene polyoxypropylene alkyl ethers, glycerin fatty acid partial esters, sorbitan fatty acid partial esters, pentaerythritol fatty acid partial esters, propylene glycol monofatty acid esters, sucrose fatty acid partial esters, polyoxyethylene sorbitan fatty acid partial esters, polyoxyethylene sorbitol fatty acid partial esters, polyethylene glycol fatty acid esters, polyglycerin fatty acid partial esters, polyoxyethylenated castor oils, polyoxyethylene glycerin fatty acid partial esters, fatty acid diethanolamides, N,N-bis-2-hydroxyalkylamines, polyoxyethylene-alkylamines, triethanolamine fatty acid esters, trialkylamine oxides, polyethylene glycols, polyethylene glycol/polypropylene glycol copolymers.

Not specifically defined, the anionic surfactants usable in the invention may be any known ones. For example, they include fatty acid salts, abietic acid salts, hydroxyalkanesulfonic acid salts, alkanesulfonic acid salts, dialkylsulfosuccinate salts, linear alkylbenzenesulfonic acid salts, branched chain alkylbenzenesulfonic acid salts, alkylnaphthalenesulfonic acid salts, alkylphenoxypolyoxyethylene-propylsulfonic acid salts, polyoxyethylene-alkylsulfophenyl ether salts N-methyl-N-oleyltaurine sodium salts, N-alkylsulfosuccinic acid monoamide disodium salts, petroleum-sulfonic acid salts, sulfated beef tallow oils, sulfate salts of fatty acid alkyl esters, alkylsulfate salts, polyoxyethylene alkylether sulfate salts, fatty acid monoglyceride sulfate salts, polyoxyethylene alkylphenyl ether sulfate salts, polyoxyethylene styrylphenyl ether sulfate salts, alkylphosphate salts, polyoxyethylene alkylether phosphate salts, polyoxyethylene alkylphenyl ether phosphate salts, styrene/maleic anhydride copolymer partial saponificates, olefin/maleic anhydride copolymer partial saponificates, naphthalenesulfonic acid salt/formalin condensates.

Not specifically defined, the cationic surfactants usable in the invention may be any known ones. For example, they include alkylamines salts, quaternary ammonium salts, polyoxyethylene alkylamine salts, polyethylene polyamine derivatives.

Not specifically defined, the ampholytic surfactants usable in the invention may be any known ones. For example, they include carboxybetaines, aminocarboxylic acids, sulfobetaines, aminosulfates imidazolines.

In the above surfactants, "polyoxyethylene" may be replaced with any other "polyoxyalkylene" such as polyoxymethylene, polyoxypropylene and polyoxybutylene; and all such surfactants are usable in the invention.

More preferred surfactants for use in the invention are fluorine-containing surfactants, which have a perfluoroalkyl group in the molecule. The fluorine-containing surfactants include, for example, anionic surfactants such as perfluoroalkylcarboxylic acid salts, perfluoroalkylsulfonic acid salts, perfluoroalkylphosphates; ampholytic surfactants such as perfluoroalkylbetaines; cationic surfactants such as perfluoroalkyltrimethylammonium salts; and nonionic surfactants such as perfluoroalkylamine oxide/perfluoroalkylethylene oxide adducts, oligomers having a perfluoroalkyl group and a hydrophilic group, oligomers having a perfluoroalkyl group and an oleophilic group, oligomers having a perfluoroalkyl group, a hydrophilic group and an oleophilic group, urethanes having a perfluoroalkyl group and an oleophilic group. In addition, the fluorine-containing surfactants described in JP-A 62-170950, 62-226143, 60-168144 are also favorably used herein.

The surfactant may be in the hydrophilic composition of the invention, preferably in an amount falling within a range of from 0.001 to 10% by mass relative to the nonvolatile component therein, more preferably from 0.01 to 5% by mass. One or more such surfactants may be in the composition either singly or as combined.

[Antimicrobial Agent]

An antimicrobial agent may be added to the hydrophilic coating composition of the invention for making the hydrophilic member of the invention have antimicrobial, antifungal and antialgal properties. Preferably, a hydrophilic water-soluble antimicrobial agent is made to exist in the hydrophilic layer formed. Containing such a hydrophilic water-soluble antimicrobial agent, the surface hydrophilic member may have excellent antimicrobial, antifungal and antialgal properties, not detracting from its surface hydrophilicity.

The antimicrobial agent is preferably a compound not lowering the hydrophilicity of the hydrophilic member to which it is added. The antimicrobial agent of the type includes an inorganic antimicrobial agent and a water-soluble organic antimicrobial agent. The antimicrobial agent to be used is one that exhibits its antimicrobial effect against bacteria such as typically *Staphylococcus aureus* and *Escherichia coli*, fungi such as mold and yeast, and other microbes existing in the environment.

The organic antimicrobial agent includes phenol ether derivatives, imidazole derivatives, sulfone derivatives, N-haloalkylthio compounds, anilide derivatives, pyrrole derivatives, quaternary ammonium salts, pyridine compounds, triazine compounds, benzisothiazoline derivatives, isothiazoline derivatives.

For example, they include 1,2-benzisothiazolin-3-one, N-fluorodichloromethylthiophthalimide, 2,3,5,6-tetrachloroisophthalonitrile, N-trichloromethylthio-4-cyclohexene-1,2-dicarboximide, copper 8-quinolinate, bis(tributyltin) oxide, 2-(4-thiazolyl)benzimidazole (hereinafter referred to as TBS), methyl 2-benzimidazolecarbamate (hereinafter referred to as BCM), 10,10'-oxybisphenoxyarsine (hereinafter referred to as OBPA), 2,3,5,6-tetrachloro-4-(methylsulfone)pyridine, bis(2-pyridylthio-1-oxide)zinc (hereinafter referred to as ZPT), N,N-dimethyl-N'-(fluorodichloromethylthio)-N'-phenylsulfamide <dichlorfluanid>, poly-(hexamethylenebiguanide)hydrochloride, dithio-2-2'-bis(benzomethylamide), 2-methyl-4,5-trimethylene-4-isothiazolin-3-one, 2-bromo-2-nitro-1,3-propanediol, hexahydro-1,3-tris-(2-hydroxyethyl)-S-triazine, p-chloro-m-xylenol, 1,2-benzisothiazolin-3-one, to which, however, the invention should not be limited.

These organic antimicrobial agents may be suitably selected and used in consideration of the hydrophilicity, the waterproofness, the sublimability and the safety. Of the organic antimicrobial agents, preferred are 2-bromo-2-nitro-1,3-propanediol, TBZ, BCM, OBPA and ZPT, in view of the hydrophilicity, the antimicrobial effect and the cost thereof.

The inorganic antimicrobial agent includes mercury, silver, copper, zinc, iron, lead, bismuth, as listed in order of the intensity of their antimicrobial effect. For example, the agent includes the metal or metal ion of silver, copper, zinc or nickel carried by a silicate carrier, a phosphate carrier, an oxide, glass or potassium titanate, or an amino acid. For example, they include zeolite-type antimicrobial agents, calcium silicate-type antimicrobial agents, zirconium phosphate-type antimicrobial agents, calcium phosphate-type antimicrobial agents, zinc oxide-type antimicrobial agents, soluble glass-type antimicrobial agents, silica gel-type antimicrobial agents, active charcoal-type antimicrobial agents, titanium oxide-type antimicrobial agents, titania-type antimicrobial agents, organic metal-type antimicrobial agents, ion-exchange ceramic-type antimicrobial agents, phyllophosphate-quaternary ammonium-type antimicrobial agents, antimicrobial stainless, to which, however, the invention should not be limited.

Natural antimicrobial agents are usable herein, including, for example, chitosan of basic polysaccharides obtained through hydrolysis of chitin included in shells of crabs and lobsters.

In the invention, preferred is Nikko's trade name "Holon Killer Beads Celler" that comprises an amino metal constructed through hybridization of metal at both sides of an amino acid.

This is not evaporative and readily undergoes interaction with the polymer and the crosslinking agent component in the hydrophilic layer, and undergoes stable molecular dispersion or solid dispersion, and therefore, the antimicrobial agent may be effectively exposed out on the surface of the hydrophilic layer. In addition, even when wetted, it does not dissolve out and may keep its effect for a long period of time. Further, it has no influence on human bodies. Moreover, it can stably disperse in the hydrophilic layer and the coating liquid, not deteriorating the hydrophilic layer and the coating liquid.

Of the above-mentioned antimicrobial agents, most preferred are silver-type inorganic antimicrobial agents and water-soluble organic antimicrobial agents as their antimicrobial effect is great. In particular, silver zeolite constructed that comprises silver held by a silicate-type carrier, zeolite, a antimicrobial agent comprising silver held by silica gel, as well as 2-bromo-2-nitro-1,3-propanediol, TPN, TBZ, BCM, OBPA, ZPT are preferred. More preferred silver zeolite-type antimicrobial agents are Shinagawa Fuel's "Zeomic", Fuji Silysia's "Sylwel" and Japan Electronic Material "Bactenon", which are commercially available. In addition, also preferred are Toa Gosei's "Novalon" and Shokubai Kagaku's "Atomy Ball" which comprise silver held by an inorganic ion-exchange ceramic, as well as a triazine-type antimicrobial agent, "San-ai Back P".

The content of the antimicrobial agent in the hydrophilic coating composition may be generally from 0.001 to 10% by mass relative to the nonvolatile component therein, preferably from 0.005 to 5% by mass, more preferably from 0.01 to 3% by mass, even more preferably from 0.02 to 1.5% by mass, most preferably from 0.05 to 1% by mass. When the content thereof is at least 0.001% by mass, the agent may effectively exhibit its antimicrobial effect. When it is at most 10% by mass, then the agent does not lower the hydrophilicity of the composition, and does not worsen the storage stability thereof, and in addition, it does not have any negative influence on the anti-soiling and anti-fogging capability of the composition.

[Inorganic Particles]

The hydrophilic composition of the invention may contain inorganic particles for improving the cured film strength of the hydrophilic film formed of it and for improving the hydrophilicity thereof. Preferred examples of the inorganic particles are, for example, silica, alumina, magnesium oxide, titanium oxide, magnesium carbonate, calcium alginate and their mixtures.

Preferably, the inorganic particles have a mean particle size of from 5 nm to 10 μm, more preferably from 0.5 to 3 μm. Within the range, the particles may stably disperse in the hydrophilic layer, thereby sufficiently keeping the film strength of the hydrophilic layer, and therefore a film having excellent hydrophilicity may be formed. The above-mentioned inorganic particles are readily available as commercial products of colloidal silica dispersion, etc.

The inorganic particles of the invention may be in the hydrophilic composition of the invention, preferably in an amount of at most 20% by mass relative to the nonvolatile component therein, more preferably at most 10% by mass. One or more different types of inorganic particles may be in the composition either singly or as combined.

[UV Absorbent]

The coating composition of the invention may contain a UV absorbent for improving the weather resistance and the durability of the hydrophilic member.

The UV absorbent includes compounds capable of absorbing UV rays to emit fluorescence, or so-called fluorescent brighteners, typically for example, benzotriazole compounds as in JP-A 58-185677, 61-190537, 2-782, 5-197075, 9-34057; benzophenone compounds as in JP-A 46-2784, 5-194483, U.S. Pat. No. 3,214,463; cinnamic acid compounds as in JP-B 48-30492, 56-21141, JP-A 10-88106; triazine compounds as in JP-A 4-298503, 8-53427, 8-239368, 10-182621, JP-T 8-501291; stilbene compounds and benzoxazole compounds as in Research Disclosure No. 24239.

Its amount to be added may be suitably determined depending on its use. In general, it is preferably from 0.5 to 15% by mass in terms of the solid content thereof in the composition.

[Antioxidant]

An antioxidant may be added to the coating liquid for forming a hydrophilic layer of the invention, for the purpose of improving the stability of the hydrophilic member of the invention. The antioxidant is described in EP-A 223739, 309401, 309402, 310551, 310552, 459416, GE-A 3435443, JP-A 54-48535, 62-262047, 63-113536, 63-163351, 2-262654, 2-71262, 3-121449, 5-61166, 5-11-449, U.S. Pat. Nos. 4,814,262, 4,980,275.

Its amount to be added may be suitably determined depending on its use. In general, it is preferably from 0.1 to 8% by mass in terms of the solid content thereof in the composition.

[Solvent]

In forming the hydrophilic layer of the hydrophilic member of the invention, it may be effective to add a suitable organic solvent to the coating liquid for forming the hydrophilic layer in order to secure the possibility of forming a uniform coating film on a substrate.

The solvent includes, for example, ketone solvents such as acetone, methyl ethyl ketone, diethyl ketone; alcohol solvents such as methanol, ethanol, 2-propanol, 1-propanol, 1-butanol, tert-butanol; chlorine-containing solvent such as chloroform, methylene chloride; aromatic solvents such as benzene, toluene; ester solvents such as ethyl acetate, butyl acetate, isopropyl acetate; ether solvents such as diethyl ether, tetrahydrofuran, dioxane; glycol ether solvents such as ethylene glycol monomethyl ether, ethylene glycol dimethyl ether.

In this case, it is effective to add the solvent within the range no causing any VOC (volatile organic solvent)-related problems, and the amount of the solvent is preferably from 0 to 50% by mass of the coating liquid to be used in forming the hydrophilic member, more preferably from 0 to 30% by mass.

[Polymer Compound]

Various polymer compounds may be added to the coating liquid for forming a hydrophilic layer of the hydrophilic member of the invention, for the purpose of controlling the physical properties of the hydrophilic layer not detracting from the hydrophilicity of the layer. The polymer compounds include acrylic polymers, polyvinyl alcohol resins, polyvinylbutyral resins, polyurethane resins, polyamide resins, polyester resins, epoxy resins, phenolic resins, polycarbonate resins, polyvinylformal resins, shellac, vinylic resins, acrylic resins, rubber resins, waxes, and other natural resins. Two or more of these may be used, as combined. Of those, preferred are vinylic copolymers obtained through copolymerization of acrylic monomers. Regarding the copolymerization composition of the polymer binder, also preferred are copolymers containing "carboxyl group-having monomer", "alkyl methacrylate" or "alkyl acrylate" as the structural unit thereof.

[Other Additives]

In addition to the above, if desired, the composition may also contain, for example, a leveling additive, a mat agent, a wax for controlling the physical properties of the film formed, and a tackifier for improving the adhesiveness of the film to a substrate not detracting from the hydrophilicity of the film.

The tackifier includes, for example, high-molecular-weight adhesive polymers described in JP-A 2001-49200, pp. 5-6 (e.g., copolymer comprising an ester of (meth)acrylic acid and an alcohol having an alkyl group having from 1 to 20 carbon atoms, an ester of (meth)acrylic acid and an alicyclic alcohol having from 3 to 14 carbon atoms, an ester of (meth) acrylic acid and an aromatic alcohol having from 6 to 14 carbon atoms); and low-molecular-eight tackifying resins having a polymerizing unsaturated bond.

The coating liquid for the hydrophilic layer of the hydrophilic member of the invention may contain zirconia chlorides, nitrates, alkoxides and organic complexes, from the viewpoint of the abrasion resistance, the acid resistance and the alkali resistance of the layer. The zirconia chloride includes zirconium chloride, zirconium oxychloride (8-hydrate), chlorine-containing zirconium alkoxide $Zr(OC_mH2m+1)_xCl_y$ (wherein m, x an y each indicate an integer with x+y=4). The zirconium nitrate includes zirconium oxynitrate (2-hydrate); the zirconium alkoxide includes zirconium ethoxide, zirconium propoxide, zirconium isopropoxide, zirconium butoxide, zirconium t-butoxide; the organic complex includes acetylacetone derivatives, concretely tetrakis(acetylacetonato)zirconium, bis(acetylacetonato)zirconium dibutoxide, bis(acetylacetonato)zirconium dichloride, tetrakis(3,5-heptanedionato)zirconium, tetrakis (2,2,6,6-tetramethyl-3,5-heptanedionato)zirconium, bis(2,2, 6,6-tetramethyl-3,5-heptanedionato)zirconium isopropoxide.

The zirconium compound may be in the hydrophilic composition of the invention, preferably in an amount of from 0 to 50% by mass relative to the nonvolatile component therein, more preferably from 5 to 25% by mass.

[Hydrophilic Member]

The hydrophilic member of the invention is characterized by having a hydrophilic film formed by applying, onto a substrate, a hydrophilic composition containing (A) a hydrophilic polymer of the following general formula (I), and (B) an alkoxide compound of an element selected from Si, Ti, Zr and Al, and heating and drying it. Preferably, the hydrophilic film may contain a catalyst (C). More preferably, the hydrophilic member has an undercoat layer between the substrate and the hydrophilic film.

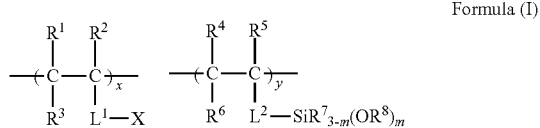

Formula (I)

In formula (I), $R^1$ to $R^8$ each independently represents a hydrogen atom or a hydrocarbon group having 8 or less carbon atoms; $L^1$ represents a single bond or a polyvalent organic linking group; $L^2$ represents a single bond, or a polyvalent organic linking group having at least one structure selected from a group consisting of —CONH—, —NHCONH—, —OCONH—, —SO$_2$NH— and —SO$_3$—; m indicates an integer of from 1 to 3; x and y are from 0 to 100 to give a number of x+y=100; X represents —OH, —OR$_a$, —COR$_a$, —CO$_2$R$_e$, —CON(R$_a$)(R$_b$), —N(R$_a$)(R$_b$), —NHCOR$_d$, —NHCO$_2$R$_a$, —OCON(R$_a$)(R$_b$), —NHCON(R$_a$)(R$_b$), —SO$_3$R$_e$, —OSO$_3$R$_e$, —SO$_2$R$_d$, —NHSO$_2$R$_d$, —SO$_2$N(R$_a$)(R$_b$), —N(R$_a$)(R$_b$)(R$_c$), —N(R$_a$)(R$_b$)(R$_c$)(R$_g$), —PO$_3$(R$_e$)(R$_f$), —OPO$_3$(R$_e$)(R$_f$) or —PO$_3$(R$_a$)(R$_e$); R$_a$, R$_b$ and R$_c$ each independently represents a hydrogen atom or a linear, branched or cyclic alkyl group having from 1 to 8 carbon atoms; R$_d$ represents a linear, branched or cyclic alkyl group having from 1 to 8 carbon atoms; R$_e$ and R$_f$ each independently represents a hydrogen atom, or a linear, branched or cyclic alkyl group having from 1 to 8 carbon atoms, or an alkali metal, an alkaline earth metal, or an onium; R$_g$ represents a linear, branched or cyclic alkyl group having from 1 to 8 carbon atoms, or a halogen atom, an inorganic anion or an organic anion.

[Undercoat Layer]

Preferably, the undercoat layer of the hydrophilic member of the invention contains a nonvolatile catalyst. The nonvolatile catalyst includes catalysts except those having a boiling point of lower than 125° C., or in other words, includes those having a boiling point not lower than 125° C. or those not having a boiling point (also including those not causing pyrolysis and phase change).

Not specifically defined, the nonvolatile catalyst for use in the invention includes a metal chelate compound and a silane-coupling agent.

Not also specifically defined, the metal chelate compound (hereinafter it may be referred to as a metal complex) includes a metal complex that comprises a metal element selected from the Groups 2A, 3B, 4A and 5A of the Periodic Table, and an oxo or hydroxy oxygen-containing compound selected from β-diketones, ketoesters, hydroxycarboxylic acids and their esters, aminoalcohols and enol-type active hydrogen compounds.

Of the constitutive metal elements, preferred are elements of the Group 2A such as Mg, Ca, St, Ba; elements of the Group 3B such as Al, Ga; elements of the Group 4A such as Ti, Zr; and elements of the Group 5A such as V, Nb, Ta. They may form complexes having an excellent catalytic effect. Of those, more preferred are complexes with any of Zr, Al and Ti.

Concretely, the metal complex may be the same as those mentioned hereinabove for the metal complex for the catalyst (C).

Not specifically defined, the silane-coupling agent usable as the nonvolatile catalyst in the invention includes those having an acidic or alkaline functional group, more concretely silane-coupling agents having an acidic functional group of, for example, a peroxo acid, a carboxylic acid, a carbohydrazonic acid, a carboximic acid, a sulfonic acid, a sulfinic acid, a sulfenic acid, a selnoic acid, selenic acid, selenenic acid, telluroic acid, and their alkali metal salts, or having a basic functional group such as an amino group.

The undercoat layer is preferably one formed through hydrolysis and polycondensation of a composition that contains an alkoxide compound of an element selected from Si, Ti, Zr and Al and a nonvolatile catalyst. The alkoxide compound of an element selected from Si, Ti, Zr and Al may be the same as those mentioned hereinabove for the specific alkoxide (B).

Thus formed, the undercoat layer may still contain the nonvolatile catalyst not losing its activity, and especially the layer may have the catalyst even in its surface, and therefore, when a hydrophilic layer is further formed on it, then the adhesiveness between the undercoat layer and the hydrophilic layer at their interface could be extremely high.

The undercoat layer of the hydrophilic member of the invention may be roughened through plasma etching or by introducing metal particles thereinto, whereby the adhesiveness between the undercoat layer and the hydrophilic layer at their interface could be further increased.

[Production of Hydrophilic Composition]

The hydrophilic composition may be produced by dissolving the specific hydrophilic polymer (A) and the specific alkoxide (C) and, in addition, preferably the catalyst (C) in a solvent such as ethanol and stirring it. The reaction temperature is preferably from room temperature to 80° C.; and the reaction time, or that is, the time for which the system is stirred is preferably within a range of from 1 to 72 hours. The stirring promotes the hydrolysis and polycondensation of the two components to give an organic-inorganic hybrid sol liquid.

Not specifically defined, the solvent to be used in preparing the hydrophilic composition comprising the specific hydrophilic polymer (A) and the specific alkoxide (B) may be any one capable of uniformly dissolving and dispersing the components therein. For example, preferred is an aqueous solvent such as methanol, ethanol, water.

As described in the above, a sol-gel process is utilized in preparing the organic-inorganic hybrid sol liquid (hydrophilic composition) to form a hydrophilic film of the hydrophilic composition of the invention. The sol-gel process is described in detail in published documents, such as Sumio Sakuhana, "Science of Sol-Gel Process" (published by Agune Shofu-sha, 1988); Ken Hirashima, "Technique of Forming Functional Thin Film by Newest Sol-Gel Process" (published by General Technology Center, 1992). The methods described in these are applicable to preparing the hydrophilic composition of the invention.

The solution that contains the hydrophilic composition of the invention is applied onto a suitable support and dried thereon, thereby obtaining a hydrophilic member of the invention. Specifically, the hydrophilic member of the invention has a hydrophilic film formed by applying the hydrophilic composition of the invention onto a support, and heating and drying it thereon.

Regarding the heating and drying condition for the coating composition-containing liquid to form the hydrophilic film, it is desirable that the film of the coating composition-containing liquid is heated and dried at a temperature falling within a range of from 50 to 200° C. for 2 minutes to 1 hour or so from the viewpoint of efficiently forming a high-density crosslinked structure, more preferably at a temperature falling within a range of from 80 to 160° C. for 5 to 30 minutes. Any known heating means may be employed for heating it. For example, preferably used is a drier having a temperature-controlling function.

When the hydrophilic member of the invention is produced by forming a hydrophilic layer and an undercoat layer on a substrate, then the catalyst may be mixed with the coating liquids immediately before the liquids are applied onto the substrate. Concretely, it is desirable that the coating liquids are applied onto the support immediately after or within 1 hour after the catalyst is mixed with them. When the catalyst is mixed with them and they are left as such for a long period of time and then applied onto a substrate, then the viscosity of the hydrophilic composition may increase, therefore often causing coating defects such as coating unevenness. The other components are also preferably mixed just before the coating operation, but after mixed, they may be stored for a long period of time.

[Substrate]

The substrate for use in the invention is not specifically defined, for which, for example, preferred are glass, plastics, metals, ceramics, wood, stones, cement, concrete, fibers, fabrics, paper, leathers and their combinations and laminates. More preferred are glass substrates and plastic substrates.

The glass substrates includes those having an inorganic compound layer formed of a metallic oxide such as silicon oxide, aluminium oxide, magnesium oxide, titanium oxide, tin oxide, zirconium oxide, sodium oxide, antimony oxide, indium oxide, bismuth oxide, yttrium oxide, cerium oxide, zinc oxide, ITO (indium tin oxide); or a metal halide such as magnesium fluoride, calcium fluoride, lanthanum fluoride, cerium fluoride, lithium fluoride, sodium fluoride. Depending on their use, also usable are float sheet glass, figured glass, frosted sheet glass, wired glass, meshed glass, reinforced glass, laminate glass, double-glazing glass, vacuum glass, security glass, highly-heat-insulating low-E double-glazing glass. The hydrophilic layer may be directly applied to the non-processed glass substrate, but if desired, one or both surfaces of the glass substrate may be processed for surface hydrophilication through oxidation or surface roughening, for the purpose of improving the adhesiveness thereof to the hydrophilic layer. The oxidation includes, for example, corona discharge treatment, glow discharge treatment, chromic acid treatment (wet treatment), flame treatment, hot air treatment, ozone/UV irradiation treatment. The surface-roughening treatment may be mechanical surface-roughening treatment by sand blasting or brushing.

The inorganic compound layer may have a single-layer of multi-layer structure. Depending on its thickness, the inorganic compound layer may keep its light transmittance, or may serve as an antireflection layer. For forming the inorganic compound layer, employable is any known method, for example a coating method such as a dip coating method, a spin coating method, a flow coating method, a spray coating method, a roll coating method, a gravure coating method, as swell as a vapor-phase method such as typically a physical vapor deposition method (PVD) or a chemical vapor deposition method (CVD), e.g., a vacuum evaporation method, a reactive vapor deposition method, an ion beam-assisted deposition method, a sputtering method, an ion-plating method.

The plastic substrate usable in the invention is not specifically defined. The substrate for optical members must be selected in consideration of the optical properties thereof such as the transparency, the refractivity and the dispersibility thereof, and therefore depending on its use, the substrate of the type may be selected in consideration of various properties thereof, for example, the physical properties such as strength, e.g., impact resistance and flexibility thereof, and also the heat resistance, the weather resistance and the durability thereof The plastic substrate usable in the invention includes films or sheets of polyester, polyethylene, polypropylene, cellophane, triacetyl cellulose, diacetyl cellulose, acetyl cellulose butyrate, polyvinyl chloride, polyvinylidene chloride, polyvinyl alcohol, polyethylene-vinyl alcohol, polystyrene, polycarbonate, polymethylpentene, polysulfone, polyether ketone, acrylic resin, nylon, fluororesin, polyimide, polyetherimide, polyether sulfone. Of those, more preferred are polyester films of polyethylene terephthalate of polyethylene naphthalate. Depending on their use, these may be used either singly or as combined in the form of their mixtures, copolymers or laminates. The thickness of the plastic substrate varies depending on the layer to be laminated thereon. For example, in a part having many curved profiles, the substrate is preferably thinner, concretely it may have a thickness of from 6 to 50 µm. On the other hand, in a flat part, or in a part that must have high strength, the substrate may have a thickness of from 50 to 400 µm.

For the purpose of increasing the adhesiveness between the substrate and the hydrophilic layer, if desired, one or both surfaces of the substrate may be processed for surface hydrophilication through oxidation or surface roughening. The oxidation includes, for example, corona discharge treatment, glow discharge treatment, chromic acid treatment (wet treatment), flame treatment, hot air treatment, ozone/UV irradiation treatment. The surface-roughening treatment may be mechanical surface-roughening treatment by sand blasting or brushing.

Further, one or more undercoat layers may be formed on the substrate. The material of the undercoat layer may be a hydrophilic resin or a water-dispersive latex.

The hydrophilic resin includes, for example, polyvinyl alcohol (PVA), cellulosic resins [e.g., methyl cellulose (MC), hydroxyethyl cellulose (HEC), carboxymethyl cellulose (CMC)], chitins, chitosans, starch, ether bond-having resins [e.g., polyethylene oxide (PEO), polyethylene glycol (PEG), polyvinyl ether (PVE)] carbamoyl group-having resins [e.g., polyacrylamide (PAAM), polyvinylpyrrolidone (PVP)]. It also includes carboxyl group-having polyacrylic acid salts, maleic acid resins, alginic acid salts, gelatins.

Of the above, preferred is at least one selected from polyvinyl alcohol resins, cellulosic resins, ether bond-having resins, carbamoyl group-having resins, carboxyl group-having resins and gelatins; and more preferred are polyvinyl alcohol (PVA) resins and gelatins.

The water-dispersive latex includes acrylic latex, polyester latex, NBR resin, polyurethane latex, polyvinyl acetate latex, SBR resin, polyamide latex. Of those, preferred is acrylic latex.

One or more different types of the above hydrophilic resin and the water-dispersive latex may be used either singly or as combined; and the hydrophilic resin and the water-dispersive latex may be combined.

A crosslinking agent capable of crosslinking the hydrophilic resin and the water-dispersive latex may be used.

The crosslinking agent applicable to the invention may be any known crosslinking agent capable of forming a crosslink by heat. General thermal crosslinking agents are described in "Handbook of Crosslinking Agents" by Shinzo Yamashita & Tohsuke Kaneko, Taisei-sha, 1981. Not specifically defined, the crosslinking agent usable in the invention may have at least two functional groups capable of effectively crosslinking with the hydrophilic resin and the water-dispersive latex. Concretely, examples of the thermal crosslinking agent for use herein are polycarboxylic acids such as polyacrylic acid; amine compounds such as polyethyleneimine; polyepoxy compounds such as ethylene or propylene glycol diglycidyl ether, tetraethylene glycol diglycidyl ether, nonaethylene glycol diglycidyl ether, polyethylene or polypropylene glycol glycidyl ether, neopentyl glycol diglycidyl ether 1,6-hexanediol diglycidyl ether, trimethylolpropane triglycidyl ether, sorbitol polyglycidyl ether; polyaldehyde compounds such as glyoxal, terephthalaldehyde; polyisocyanate compounds such as tolylene diisocyanate, hexamethylene diisocyanate, diphenylmethane isocyanate, xylylene diisocyanate, polymethylene polyphenyl isocyanate, cyclohexyl diisocyanate, cyclohexanephenylene diisocyanate, naphthalene-1,5-diisocyanate, isopropylbenzene-2,4-diisocyanate, polypropylene glycol/tolylene diisocyanate adducts; blocked polyisocyanate compounds, tetraalkoxysilanes and other silane-coupling agents, as well as metal crosslinking agents such as aluminium, copper or iron(III) acetylacetonate; and polymethylol compounds such as trimethylolmelamine, pentaerythritol. Of those thermal crosslinking agents, preferred are water-soluble crosslinking agents for easily preparing the coating liquids and for preventing the hydrophilicity of the hydrophilic layer formed from lowering.

The total amount of the hydrophilic resin and/or the water-dispersive latex in the undercoat layer is preferably from 0.01 to 20 g/m$^2$, more preferably from 0.1 to 10 g/m$^2$.

The plastic substrate for use herein may comprise an inorganic compound layer such as that mentioned hereinabove for glass sheets, formed on a plastic sheet. In this case, the inorganic compound layer may serve as an antireflection layer. The inorganic compound layer may be formed on a plastic sheet in the same manner as that mentioned hereinabove for inorganic substrates.

When an inorganic compound layer is formed on a transparent plastic substrate, a hard coat layer may be formed between the two. The hard coat layer may improve the surface hardness of the substrate having it, and may smooth the substrate surface, and therefore, the adhesiveness between the transparent plastic substrate and the inorganic compound layer may be improved, the scratch resistance of the substrate may be improved, and the inorganic compound layer may be prevented from being cracked when the substrate is bent. Use of the substrate of the type improves the mechanical strength of the hydrophilic member. Not specifically defined, the hard coat layer may be formed of any material having transparency and suitable strength, e.g., mechanical strength. For example, the layer may be formed of a resin curable through irradiation with ionizing radiations or UV rays, or a thermosetting resin. Especially preferred are UV-curable acrylic resins, organosilicon resins, thermosetting polysiloxane resins. Preferably, the refractive index of the resin is on the same level as or is near to the refractive index of the transparent plastic substrate.

Not specifically defined, the hard coat layer may be formed in any method in which the layer may be formed uniformly. The thickness of the hard coat layer may be at least 3 μm for its sufficient strength, but is preferably within a range of from 5 to 7 μm in view of the transparency, the coating accuracy and the handlability thereof. Further, inorganic or organic particles having a mean particle size of from 0.01 to 3 μm may be mixed and dispersed in the hard coat layer for light diffusion treatment, or that is, antiglare treatment of the layer. Not specifically defined, the material of the particles may be any transparent one but is preferably one having a low refractive index. More preferred are silicon oxide and magnesium fluoride in view of their stability and heat resistance. The light diffusion treatment may also be attained by roughening the surface of the hard coat layer.

[Layer Constitution of Hydrophilic Member in Practice]

In case where the hydrophilic member of the invention is used, as expected to exhibit its anti-soiling and/or anti-fogging effect, then any other layer may be added thereto, depending on its object, shape and service site. The optional layer constitution is described below.

1) Adhesive Layer:

In case where the hydrophilic member of the invention is stuck to any other substrate in its use, then a pressure-sensitive adhesive layer is preferably formed on the substrate. The adhesive may be any one used in ordinary adhesive sheets, such as rubber adhesive, acrylic adhesive, silicone adhesive, vinyl ether adhesive, styrene adhesive.

For optically transparent applications, selectively used are adhesives for optical use. When colored, semitransparent or matted patterns are needed, then the substrate may be patterned, or as the case may be, dye or organic or inorganic particles may be added to adhesives to effectively satisfy the requirement.

In case where an adhesiveness enhancer is needed, then one or more adhesiveness-enhancing resins such as rosin-type resins, terpene resins, petroleum-type resins, styrene resins and their hydrogenates may be used either singly or as combined.

The adhesive for use in the invention is a high-power adhesive, and its adhesion power is at least 200 g/25 mm, preferably at least 300 g/25 mm, more preferably at least 400 g/25 mm. The adhesion power as referred to herein is determined according to the 180 degree-peeling test of JISZ 0237.

2) Release Layer:

In case where the hydrophilic member of the invention has the above adhesive layer, a release layer may be added to it. Preferably, the release layer contains a lubricant for exhibiting its releasing lubricity. For the lubricant, generally used are silicone-type lubricants comprising polyorganosiloxane, and also fluorine-containing compounds, long chain alkyl-modified polyvinyl alcohols, and long chain alkyl-modified polyethyleneimines. In addition, also usable herein are other various lubricants such as hot-melt lubricants, and monomer lubricants capable of curing lubricative monomers trough radical polymerization, cationic polymerization or polycondensation; and copolymer resins such as urethane-silicone-fluorine compound copolymer resins, as well as resin blends such as silicone resin/acrylic resin blend, fluororesin/acrylic resin blend. In addition, the layer may be a hard-coat lubricant layer formed by curing a curing composition that contains a compound having any atom of fluorine atom and/or silicon atom and an active energy ray-polymerizing group.

3) Other Layers:

A protective layer may be formed on the hydrophilic layer. The protective layer has a function of preventing the surface of the hydrophilic layer from being scratched during handling, transportation or storage and a function of preventing the hydrophilicity of the layer from being lowered due to adhesion of a pollutant thereto. For the protective layer, usable is the hydrophilic polymer layer used for the above lubricant layer. The protective layer may be peeled off after the hydrophilic layer has been stuck to a suitable substrate.

[Form of Structure]

The structure having a hydrophilic layer of the invention may be provided in the form of a sheet, a roll or a ribbon, or may be provided after previously cut for the purpose of sticking it to a suitable substrate.

In case where the hydrophilic member coated with the hydrophilic coating film of the invention is applied to windowpanes (as combined therein or stuck thereto), its transparency is important from the viewpoint of securing view therethrough. The hydrophilic coating film of the invention has excellent transparency, not detracting from its transparency even though it is thick, and therefore may satisfy both excellent transparency and excellent durability. Preferably, the thickness of the hydrophilic coating film of the invention is from 0.01 μm to 100 μm, more preferably from 0.05 μm to 50 μm, most preferably from 0.1 μm to 20 μm. When the film thickness is at least 0.01 μm, it is favorable since the film has sufficient hydrophilicity and durability; and when at most 100 μm, it is also favorable since the film is not cracked and is therefore free from a problem of the film formability.

The transparency may be evaluated by determining the light transmittance of the film with a spectrophotometer within a visible light region (400 nm to 800 nm). Preferably, the light transmittance is from 70% to 100%, more preferably from 75% to 95%, most preferably from 80% to 95%. Within the range, the hydrophilic member coated with the hydrophilic coating film may be applied to various uses.

The hydrophilic member of the invention may be produced by applying the coating liquid composition for forming a hydrophilic layer onto a suitable substrate, and drying and heating it to form the intended surface hydrophilic layer thereon. The heating temperature and the heating time for forming the hydrophilic layer are not specifically defined, so far as they may be enough for forming the intended tough coating film. In view of the production aptitude, the heating temperature is preferably 150° C. or lower, and the heating time is preferably within 1 hour.

The hydrophilic member of the invention may be produced in any known coating method with no specific limitation, for which, for example, applicable is a spray coating method, a dip coating method, a flow coating method, a spin coating method, a roll coating method, a film applicator-assisted method, a screen printing method, a bar coater-assisted method, a brush coating method, a sponge coating method.

Objects to which the hydrophilic member of the invention is applicable are described. When they are expected to exhibit an anti-fogging effect, they are transparent, for example, transparent glass substrates or transparent plastic substrates, as well as lenses, prisms, mirrors, etc.

Glass may be any of soda glass, lead glass borosilicate glass. Depending on their use, also usable are float sheet glass, figured glass, frosted sheet glass, meshed glass, wired glass, reinforced glass, laminate glass, double-glazing glass, vacuum glass, security glass, highly-heat-insulating low-E double-glazing glass.

The applications of the anti-fogging member include mirrors such as rearview mirrors for vehicles, mirrors in bathrooms, mirrors in washrooms, mirrors for dental use, road mirrors; lenses such as eyeglass lenses, optical lenses, camera lenses, endoscope lenses, lenses for illumination, lenses for semiconductors, lenses for duplicators; prisms; windowpanes for buildings, control towers; glass for other building materials; windowpanes for various vehicles, such as cars, railroad carriages, airplanes, ships, midget submarines, snowmobiles, ropeway gondolas, gondolas in amusement parks; windshields for various vehicles, such as cars, railroad carriages, airplanes, ships, midget submarines, snowmobiles, motorcycles, ropeway gondolas, gondolas in amusement parks; protector goggles, sports goggles, protector mask shields, sports mask shields, helmet shields, glass cases for frozen food display; cover glass for metering instruments; and films to be stuck to the surface of the above articles. The most preferred application is to glass for cars and building materials.

In case where the surface hydrophilic member of the invention is expected to exhibit an anti-soiling effect, preferred examples of its substrate are metals, ceramics, wood, stones, cement, concrete, fibers, fabrics, paper and their combinations and laminations, in addition to glass and plastics.

The applications of the anti-soiling member include building materials; building exterior materials such as siding walls, roofs; building interior materials, window frames, windowpanes, structural members; exterior and coating materials for vehicles such as cars, railroad carriages, airplanes, ships, bicycles, motorcycles; exterior materials dust covers and coatings for machinery and articles; traffic signs, various display devices, advertising towers, road noise barriers, railroad noise barriers, bridges, guardrail exterior and coating materials, tunnel interior and coating materials, insulators, solar cell covers, heat collector covers for solar heaters, plastic greenhouses, covers for vehicle lights, housing equipment, toilets, bathtubs, washstands, lighting instruments, lighting instrument covers, kitchen utensils, dishes, dish washers, dish driers, sinks, cooking ovens, kitchen hoods, ventilation fans, and films to be stuck to the surface of the above articles.

They further include signboards, traffic signs, noise barriers, plastic greenhouses, insulators, covers for vehicles, tent materials, reflectors, sliding doors, screen doors, solar cell covers, heat collector covers for solar heaters, streetlamps, paved roads, outdoor lighting instruments, stone materials and tiles for artificial waterfalls and artificial fountains, bridges, greenhouses, siding materials, inter-wall and inter-insulator sealants, guardrails, porches, vending machines, outdoor units of air conditioners, outdoor benches, various display devices, shutters, tollgates, rate boxes, roof gutters; lamp protecting covers, dust covers and coatings for vehicles; coatings for machinery and articles; exterior and coating materials for advertising towers, structural members, housing equipment, toilets, bathtubs, washstands, lighting instruments, kitchen utensils, dishes, dish driers, sinks, cooking ovens, kitchen hoods, ventilation fans, window rails, window frames, tunnel interior walls, tunnel interior lighting instruments, window sashes, heat radiation fins for heat exchangers, paved roads, mirror for bathrooms and washrooms, ceilings for plastic greenhouses, washing stands, car bodies, and films and emblems stickable to those articles.

The member is also applicable to roof materials, antenna and power transmission liens in snowy districts, and when it is applied to these, it may exhibit an excellent snow-sticking preventing effect.

In case where the surface hydrophilic member of the invention is expected to have rapid driability in wet with water or the like, preferred examples of its substrate are metals, ceramics, wood, stones, cement, concrete, fibers, fabrics, paper and their combinations and laminations, in addition to glass and plastics. The applications of the hydrophilic member having rapid driability include building materials; building exterior materials such as siding walls, roofs; building interior materials, window frames, windowpanes, structural members; exterior and coating materials for vehicles such as cars, railroad carriages, airplanes, ships, bicycles, motorcycles; exterior materials dust; covers and coating materials for machinery and articles; traffic signs, various display devices, advertising towers, road noise barriers, railroad noise barriers, bridges, guardrail exterior and coating materials, tunnel interior and coating materials, insulators, solar cell covers, heat collector covers for solar heaters, plastic greenhouses, covers for vehicle lights, housing equipment, toilets, bathtubs, washstands, lighting instruments, lighting instrument covers, kitchen utensils, dishes, dish washers, dish driers, sinks, cooking ovens, kitchen hoods, ventilation fans, and films to be stuck to the surface of the above articles.

They further include signboards, traffic signs, noise barriers, plastic greenhouses, insulators, covers for vehicles, tent materials, reflectors, sliding doors, screen doors, solar cell covers, heat collector covers for solar heaters, streetlamps, paved roads, outdoor lighting instruments, stone materials and tiles for artificial waterfalls and artificial fountains, bridges, greenhouses, siding materials, inter-wall and inter-insulator sealants, guardrails, porches, vending machines, outdoor units of air conditioners, outdoor benches, various display devices, shutters, tollgates, rate boxes, roof gutters; lamp protecting covers, dust covers and coatings for vehicles; coatings for machinery and articles; exterior and coating materials for advertising towers, structural members, housing equipment, toilets, bathtubs, washstands, lighting instruments, kitchen utensils, dishes, dish driers, sinks, cooking ovens, kitchen hoods, ventilation fans, window rails, window frames, tunnel interior walls, tunnel interior lighting instruments, window sashes, heat radiation fins for heat exchangers, paved roads, mirror for bathrooms and washrooms, ceilings for plastic greenhouses, washing stands, car bodies, and films and emblems stickable to those articles. In case where the production process of producing the products applicable to such uses includes a drying step, the drying time may be shortened and the producibility may be thereby improved. This is still another advantage of the invention.

EXAMPLES

The invention is described in more detail with reference to the following Examples, to which, however, the invention should not be limited.

(Production of Specific Hydrophilic Polymer (1))

28.3 g of acrylamide, 27.5 g of acrylamide-3-(triethoxysilyl)propyl, and 85 g of 1-methoxy-2-propanol were put into a 300-ml three-neck flask, and 0.7 g of dimethyl 2,2'-azobis(2-methylpropionate) was added thereto in a nitrogen atmosphere at 80° C. This was kept at that temperature with stirring for 6 hours, and then cooled to room temperature. This was put into 2 liters of n-hexane, and the precipitated solid was taken out through filtration. The resulting solid was washed with n-hexane to obtain Compound (1), a type of the specific hydrophilic polymer (1). After dried, its mass was 53.2 g. Through GPC (polyethylene oxide standard), it was a polymer having a mass-average molecular weight 22,000.

The other specific hydrophilic polymers used in Examples were produced in the same manner as above, and used for evaluation.

Example 1

[Hydrophilic Sol-Gel Liquid]

10 g of the specific hydrophilic polymer (1) of (A) was mixed in 100 g of pure water, and stirred for 2 hours at room temperature to prepare it.

[Hydrophilic Composition]

2.5 g of an aqueous 5 mas. % solution of the following anionic surfactant was mixed with 120 g of the hydrophilic sol-gel liquid to prepare a hydrophilic composition.

[Coating Method]

A float sheet glass (thickness 2 mm), most popular transparent sheet glass was prepared, and the surface of the sheet glass was hydrophilicated through UV/O$_3$ treatment for 10 minutes. Then, the hydrophilic composition was applied onto it in a mode of spin coating, and dried in an oven at 100° C. for 10 minutes to thereby form a hydrophilic layer having a dry coating amount of 0.1 g/m$^2$.

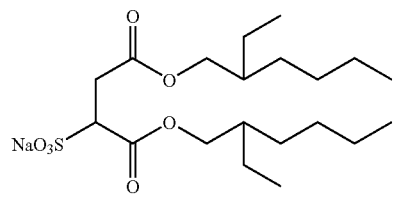

Example 2

A hydrophilic member was produced in the same manner as in Example 1, for which, however, the coating method was changed to the method mentioned below.

A float sheet glass (thickness 2 mm), most popular transparent sheet glass was prepared, and the surface of the sheet glass was hydrophilicated through UV/O$_3$ treatment for 10 minutes. Then, the hydrophilic composition in Example 1 was applied onto it in a mode of bar coating, and dried in an oven at 150° C. for 30 minutes to form a hydrophilic layer having a dry coating amount of 3.0 g/m$^2$.

Examples 3 to 5

Hydrophilic members were produced in the same manner as in Example 2, for which, however, the specific hydrophilic polymer (1) of (A) was changed to the following:

Example 3

Specific hydrophilic polymer (2),

Example 4

Specific hydrophilic polymer (11),

Example 5

Specific hydrophilic polymer (24).

Example 6

[Hydrophilic Sol-Gel Liquid]

10 g of the specific hydrophilic polymer (1) was mixed in 2 g of ethyl alcohol, 0.05 g of an aqueous 1 N hydrochloric acid solution as the catalyst (C), and 100 g of pure water, and stirred for 2 hours at room temperature to prepare it.

[Hydrophilic Composition]

2.5 g of an aqueous 5 mas. % solution of the anionic surfactant described in the Example 1 was mixed with 120 g of the hydrophilic sol-gel liquid to prepare a hydrophilic composition.

[Coating Method]

A float sheet glass (thickness 2 mm), most popular transparent sheet glass was prepared, and the surface of the sheet glass was hydrophilicated through UV/O$_3$ treatment for 10 minutes. Then, the hydrophilic composition was applied onto it in a mode of spin coating, and dried in an oven at 100° C. for 10 minutes to thereby form a hydrophilic layer having a dry coating amount of 0.1 g/m$^2$.

Example 7

A Hydrophilic member was produced in the same manner as in Example 6, for which, however, the catalyst (C) was changed to the following:
Example 7 titanium acetylacetonate 0.2 g.
0.1 g of acetylacetone and 0.1 g of tetraethyl orthotitanate were added to the hydrophilic sol-gel liquid to prepare it.

Example 8

A hydrophilic member was produced in the same manner as in Example 7, for which, however, the coating method was changed to the method mentioned below.

A float sheet glass (thickness 2 mm), most popular transparent sheet glass was prepared, and the surface of the sheet glass was hydrophilicated through $UV/O_3$ treatment for 10 minutes. Then, the hydrophilic composition in Example 7 was applied onto it in a mode of bar coating, and dried in an oven at 150° C. for 30 minutes to form a hydrophilic layer having a dry coating amount of 3.0 $g/m^2$.

Examples 9 and 10

Hydrophilic members were produced in the same manner as in Example 8, for which, however, the catalyst (C) was changed to the following:

Example 9 ethylacetacetate aluminium diisopropylate (Kawaken Fine Chemical's ALCH) 0.2 g,

Example 10 zirconium chelate compound 0.2 g.

50 g of tetrabutoxyzirconium and 20 g of ethyl acetacetate were put into a reactor equipped with a stirrer, and stirred at room temperature for 1 hour to prepare the zirconium chelate compound.

Examples 11 to 13

Hydrophilic members were produced in the same manner as in Example 8, for which, however, the specific hydrophilic polymer (A) was changed to the following:

Example 11

Specific hydrophilic polymer (2),

Example 12

Specific hydrophilic polymer (11),

Example 13

Specific hydrophilic polymer (24).

Examples 14 to 16

Hydrophilic members were produced in the same manner as in Example 8, for which, however, the substrate was changed to the following:

Example 14

UV/ozone-washed, commercial mirror,

Example 15 polyethylene terephthalate substrate of which the surface was hydrophilicated through glow treatment (thickness 50 μm),

Example 16

Alkali-degreased aluminium substrate (thickness 100 μm).

Examples 17 and 18

Hydrophilic members were produced in the same manner as in Example 8, for which, however, the dry coating amount was changed to the following:

Example 17 dry coating amount 10 $g/m^2$,

Example 18 dry coating amount 30 $g/m^2$.

Examples 19 and 20

Hydrophilic members were produced in the same manner as in Example 8, for which, however, 2 g of the following compound was added to the hydrophilic composition of Example 8.

Example 19 zirconium oxychloride,

Example 20 tetrakis(acetylacetonato)zirconium.

Examples 21 and 22

Hydrophilic members were produced in the same manner as in Example 8, for which, however, 0.5 g of the following compound was added to the hydrophilic composition of Example 8.

Example 21

TBZ (Chugoku Kogyo Co., Ltd.),

Example 22

Zeomic (SINANEN ZEOMIC CO., LTD.).

Example 23

[Hydrophilic Composition]
10 g of (A) the specific hydrophilic polymer (1) was mixed in 100 g of pure water, and stirred at room temperature for 2 hours to prepare a hydrophilic sol-gel liquid. 2.5 g of an aqueous 5 mas. % solution of an anionic surfactant described in Example 1 was mixed in 120 g of the hydrophilic sol-gel liquid to prepare a hydrophilic composition.

[Catalyst Liquid]

2.0 g of acetylacetone and 2.5 g of tetraethyl orthotitanate were mixed in 50 g of ethyl alcohol and 2 g of pure water, and stirred at room temperature for 1 hour to prepare it.

[Coating Method]

A float sheet glass (thickness 2 mm), most popular transparent sheet glass was prepared, and the surface of the sheet glass was hydrophilicated through UV/$O_3$ treatment for 10 minutes. Then, a solution prepared by mixing 130 g of the above hydrophilic composition and 2.5 g of the above catalyst liquid and stirring it at room temperature for 5 minutes, was applied onto the substrate in a mode of bar coating, and dried in an oven at 150° C. for 30 minutes to form a hydrophilic layer having a dry coating amount of 3.0 g/m$^2$ Example 24

[Hydrophilic Sol-Gel Liquid]

12 g of tetramethoxysilane (B) and 4 g of the specific hydrophilic polymer (1) of (A) were mixed in 20 g of ethyl alcohol and 100 g of pure water, and stirred at room temperature for 2 hours to prepare it.

[Hydrophilic Composition]

20 g of an aqueous 20 mas. % colloidal silica dispersion (Snowtex C), 4 g of an aqueous 5 mas. % solution of the anionic surfactant described in Example 1, and 60 g of pure water were mixed in 140 g of the above hydrophilic sol-gel liquid, thereby preparing a hydrophilic composition.

[Coating Method]

A float sheet glass (thickness 2 mm), most popular transparent sheet glass was prepared, and the surface of the sheet glass was hydrophilicated through UV/$O_3$ treatment for 10 minutes. Then, the above hydrophilic composition was applied onto it in a mode of spin coating, and dried in an oven at 100° C. for 10 minutes to form a hydrophilic layer having a dry coating amount of 0.1 g/m$^2$.

Examples 25 to 27

Hydrophilic members were produced in the same manner as in Example 24, for which, however, the specific hydrophilic polymer (1) of (A) was changed to the following:

Example 25

Specific hydrophilic polymer (2),

Example 26

Specific hydrophilic polymer (11),

Example 27

Specific hydrophilic polymer (24).

Example 28

[Hydrophilic Sol-Gel Liquid]

12 g of tetramethoxysilane and 4 g of the specific hydrophilic polymer (1) were mixed in 20 g of ethyl alcohol, 0.2 g of an aqueous 1 N hydrochloric acid solution as the catalyst (C), and 100 g of pure water, and stirred at room temperature for 2 hours to prepare it.

[Hydrophilic Composition]

20 g of an aqueous 20 mas. % colloidal silica dispersion (Snowtex C), 4 g of an aqueous 5 mas. % solution of the anionic surfactant described in Example 1, and 60 g of pure water were mixed in 140 g of the above hydrophilic sol-gel liquid, thereby preparing a hydrophilic composition.

[Coating Method]

A float sheet glass (thickness 2 mm), most popular transparent sheet glass was prepared, and the surface of the sheet glass was hydrophilicated through UV/$O_3$ treatment for 10 minutes. Then, the above hydrophilic composition was applied onto it in a mode of spin coating, and dried in an oven at 100° C. for 10 minutes to form a hydrophilic layer having a dry coating amount of 0.1 g/m$^2$.

Examples 29 to 31

Hydrophilic members were produced in the same manner as in Example 28, for which, however, the catalyst (C) was changed to the following:

Example 29

Titanium acetylacetonate 2 g.

1 g of acetylacetone and 1 g of tetraethyl orthotitanate were added to the hydrophilic sol-gel liquid to prepare it, Example 30

Ethyl acetacetate aluminium diisopropylate (Kawaken Fine Chemical's ALCH) 2 g,

Example 31

Zirconium chelate compound 2 g.

50 g of tetrabutoxyzirconium and 20 g of ethyl acetacetate were put into a reactor equipped with a stirrer, and stirred at room temperature for 1 hour to obtain the zirconium chelate compound.

Examples 32 to 34

Hydrophilic members were produced in the same manner as in Example 29, for which, however, the specific alkoxide (B) was changed to the following:

Example 32

Aluminium ethoxide,

Example 33

Zirconium ethoxide,

Example 34

Titanium ethoxide.

Examples 35 to 37

Hydrophilic members were produced in the same manner as in Example 29, for which, however, the specific hydrophilic polymer (A) was changed to the following:

Example 35

Specific hydrophilic polymer (2),

Example 36

Specific hydrophilic polymer (11),

Example 37

Specific hydrophilic polymer (24).

Examples 38 to 40

Hydrophilic members were produced in the same manner as in Example 29, for which, however, the substrate was changed to the following:

Example 38

UV/ozone-washed, commercial mirror,

Example 39

Polyethylene terephthalate substrate (thickness 50 µm) of which the surface was hydrophilicated through glow treatment,

Example 40

Alkali-degreased aluminium substrate (thickness 100 µm).

Examples 41 and 42

Hydrophilic members were produced in the same manner as in Example 29, for which, however, the coating method was changed to the following:

Example 41

The hydrophilic composition was applied onto the substrate in a mode of bar coating, and dried in an oven at 100° C. for 10 minutes to form a hydrophilic layer having a dry coating amount of 1.0 g/m$^2$,

Example 42

The hydrophilic composition was applied onto the substrate in a mode of bar coating, and before dried, it was rotated at 200 rpm for 300 seconds using a spinner for film formation, thereby forming a hydrophilic layer having a dry coating amount of 15 g/m$^2$.

Examples 43 and 44

Hydrophilic members were produced in the same manner as in Example 29, for which, however, 1.0 g of the following compound was added to the hydrophilic composition in Example 29.

Example 43

Zirconium oxychloride,

Example 44

Tetrakis(acetylacetonato)zirconium.

Examples 45 and 46

Hydrophilic members were produced in the same manner as in Example 29, for which, however, 0.2 g of the following compound was added to the hydrophilic composition of Example 29.

Example 45

TBZ (Chugoku Kogyo Co., Ltd.),

Example 46

Zeomic (SINANEN ZEOMIC CO., LTD.).

Example 47

[Hydrophilic Composition]

12 g of tetramethoxysilane (B) and 4 g of the specific hydrophilic polymer (1) of (A) were mixed in 100 g of pure water, and stirred at room temperature for 2 hours to prepare a hydrophilic sol-gel liquid. 20 g of an aqueous 20 mas. % colloidal silica dispersion (Snowtex C), 4 g of an aqueous 5 mas. % solution of the anionic surfactant described in Example 1, and 60 g of pure water were mixed in 120 g of the above hydrophilic sol-gel liquid to prepare a hydrophilic composition.

[Catalyst Liquid]

2.0 g of acetylacetone and 2.5 g of tetraethyl orthotitanate were mixed in 50 g of ethyl alcohol and 2 g of pure water, and stirred at room temperature for 1 hour to prepare it.

[Coating Method]

A float sheet glass (thickness 2 mm), most popular transparent sheet glass was prepared, and the surface of the sheet glass was hydrophilicated through UV/O$_3$ treatment for 10 minutes. Then, 160 g of the above hydrophilic composition and 20 g of the above catalyst liquid were mixed and stirred at room temperature for 5 minutes, and the resulting liquid composition was applied onto the substrate in a mode of spin coating, and dried in an oven at 100° C. for 10 minutes to form a hydrophilic layer having a dry coating amount of 0.1 g/m$^2$.

Comparative Example 1

A surface hydrophilic member of Comparative Example 1 was produced in the same manner as in Example 29, for which, however, a comparative hydrophilic polymer (i) (mass-average molecular weight 7700) having the following structure not falling within the scope of the invention was used in place of the specific hydrophilic polymer (1) of the invention.

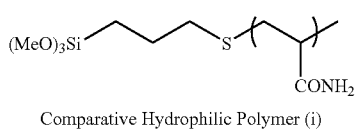

Comparative Hydrophilic Polymer (i)

Comparative Example 2

A surface hydrophilic member of Comparative Example 2 was produced in the same manner as in Example 29, for which, however, a comparative hydrophilic polymer (ii) (mass-average molecular weight 10000) having the following structure not falling within the scope of the invention was used in place of the specific hydrophilic polymer (1) of the invention.

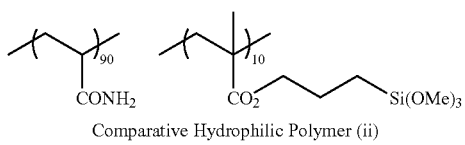

Comparative Hydrophilic Polymer (ii)

Comparative Example 3

In place of the hydrophilic film of the invention, a photocatalyst film (TOTO's Hydrotect) was stuck to the surface of the support used in the above Examples, thereby producing a surface hydrophilic member of Comparative Example 3.

Example 48

[Sol-Gel Liquid for Undercoat Layer]

8 g of tetramethoxysilane was mixed in 200 g of ethyl alcohol, 10 g of acetylacetone as a nonvolatile catalyst, 10 g of tetraethyl orthotitanate and 100 g of pure water, and stirred at room temperature for 2 hours to prepare it.

[Composition for Undercoat Layer]

100 g of an aqueous, 20 mas. % colloidal silica dispersion (Snowtex C), 30 g of an aqueous 5 mas. % solution of the anionic surfactant described in Example 1, and 450 g of pure water were mixed with 500 g of the above sol-gel liquid for undercoat layer to prepare a coating liquid.

[Coating Method]

A float sheet glass (thickness 2 mm), most popular transparent sheet glass was prepared, and the surface of the sheet glass was hydrophilicated through UV/$O_3$ treatment for 10 minutes. Then, the undercoat composition was applied onto it in a mode of spin coating, and dried in an oven at 100° C. for 10 minutes to thereby form an undercoat layer having a dry coating amount of 0.1 g/m². This was fully cooled at room temperature, and then hydrophilic layer of Example 8 was formed on the undercoat layer

Examples 49 to 53

Hydrophilic members were produced in the same manner as in Example 48, for which, however, the hydrophilic layer was changed to the following:

Example 49

Hydrophilic layer as in Example 9,

Example 50

Hydrophilic layer as in Example 10,

Example 51

Hydrophilic layer as in Example 11,

Example 52

Hydrophilic layer as in Example 12,

Example 53

Hydrophilic layer as in Example 13.

Examples 54 to 56

Hydrophilic members were produced in the same manner as in Example 48, for which, however, the substrate was changed to the following:

Example 54

UV/ozone-washed, commercial mirror,

Example 55 polyethylene terephthalate substrate of which the surface was hydrophilicated through glow treatment (thickness 50 μm), Example 56

Alkali-degreased aluminium substrate (thickness 100 μm).

Examples 57 to 63

Hydrophilic members were produced in the same manner as in Example 48, for which, however, the hydrophilic layer was changed to the following:

Example 57

Hydrophilic layer as in Example 17,

Example 58

Hydrophilic layer as in Example 18,

Example 59

Hydrophilic layer as in Example 19,

Example 60

Hydrophilic layer as in Example 20,

Example 61

Hydrophilic layer as in Example 21,

Example 62

Hydrophilic layer as in Example 22,

Example 63

Hydrophilic layer as in Example 23.

Examples 64 to 72

Hydrophilic members were produced in the same manner as in Example 48, for which, however, the hydrophilic layer was changed to the following:

Example 64

Hydrophilic layer as in Example 29,

Example 65

Hydrophilic layer as in Example 30,

Example 66

Hydrophilic layer as in Example 31,

Example 67

Hydrophilic layer as in Example 32,

Example 68

Hydrophilic layer as in Example 33,

Example 69

Hydrophilic layer as in Example 34,

Example 70

Hydrophilic layer as in Example 35,

Example 71

Hydrophilic layer as in Example 36,

Example 72

Hydrophilic layer as in Example 37.

Examples 73 to 75

Hydrophilic members were produced in the same manner as in Example 64, for which, however, the substrate was changed to the following:

Example 73

UV/ozone-washed, commercial mirror,

Example 74 polyethylene terephthalate substrate of which the surface was hydrophilicated through glow treatment (thickness 50 μm), Example 75

Alkali-degreased aluminium substrate (thickness 100 μm).

Examples 76 to 82

Hydrophilic members were produced in the same manner as in Example 48, for which, however, the hydrophilic layer was changed to the following:

Example 76

Hydrophilic layer as in Example 41,

Example 77

Hydrophilic layer as in Example 42,

Example 78

Hydrophilic layer as in Example 43,

Example 79

Hydrophilic layer as in Example 44,

Example 80

Hydrophilic layer as in Example 45,

Example 81

Hydrophilic layer as in Example 46,

Example 82

Hydrophilic layer as in Example 47.

[Evaluation of Hydrophilic Member]
[Surface Free Energy]

The degree of hydrophilicity of the surface of a hydrophilic layer is generally measured, based on the contact angle to a water drop thereon (Kyowa Interface Science's Drop Master 500). However, on the surface having extremely high hydrophilicity as in the invention, the water drop contact angle may be at most 10°, even at most 5°; and therefore, the method may be limitative for mutual comparison of the degree of hydrophilicity of the surface. On the other hand, for evaluating the degree of hydrophilicity of a solid surface in more detail, there is known a method of measuring surface free energy. Various methods have been proposed for it. In the invention, a Zisman plotting method was employed as an example of measuring surface free energy. Concretely, the method is as follows: Based on the phenomenon that an aqueous solution of an inorganic electrolyte such as magnesium chloride may have a larger surface tension increasing with the increase in its concentration, the contact angle of a sample is measured in air at room temperature using the aqueous solution. The data with the aqueous solution having a different concentration are plotted on a graph, in which the horizontal axis indicates the surface tension of the aqueous solution and the vertical axis indicates the contact angle as $\cos\theta$. The graph gives a linear relationship between the two parameters. The surface tension that gives $\cos\theta=1$, or that is, contact angle=0° is defined as the surface free energy of the solid analyzed according to the method. The surface tension of water is 72 mN/m, and it may be said that the samples having a larger value of surface free energy have a higher degree of hydrophilicity.

[Transparency]

When the transparent member coated with the hydrophilic film of the invention is used for windowpanes, its transparency is important for securing view through it. The hydrophilic film of the invention has excellent transparency, and even though it is thick, its transparency does not lower. Accordingly, the hydrophilic member of the invention may satisfy both transparency and durability.

The transparency of the member may be evaluated by measuring the light transmittance through it within a visible light range (400 nm to 800 nm), using a spectrophotometer (Hitachi Spectrophotometer U3000).

[Evaluation of Abrasion Resistance]

The surface of the hydrophilic member obtained is rubbed with a nonwoven fabric (Asahi Chemical Fibers' BEMCOT) under a load of 200 g applied thereto, in a reciprocating motion repeatedly 250 times. Before and after the rubbing test, the sample is visually checked for appearance change.

A: No fault found in the surface after the test.
B: A fault found after the test.
C: Many faults found after the test.

[Scratch Resistance]

The surface of the hydrophilic layer is scanned with a 0.1-mm diameter sapphire needle while the load applied thereto is varied, starting from 5 g, at regular intervals of 5 g; and the load under which the layer has come to be scratched is measured (with Shinto Science's Scratch Strength Tester Type 18S). This indicates the scratch resistance of the sample. Samples not scratched under a higher load have better durability.

[Evaluation of Fogging Resistance]

The hydrophilic member obtained in the above is exposed to water vapor for 1 minute under a fluorescent lamp in a room in the daytime. After it is separated from water vapor, it is put in an environment at 25° C. and 10% RH, and then again exposed to the fluorescent lamp under the same condition as previously. Then, the sample is checked for fogging and change, and is organoleptically evaluated as in the following three ranks:

A: No fogging found.
B: Fogged but the fogging disappeared within 10 seconds, and no more fogging found thereafter.
C: Fogged, and the fogging did not disappear even after 10 seconds.

[Evaluation of Soiling Resistance]

A line is drawn on the surface of the hydrophilic member obtained in the above, using an oily ink (Mitsubishi Pencil's oily marker), then a water jet is continuously applied thereto, and the sample is checked whether the line could be erased off, and is organoleptically evaluated as in the following three ranks:

A: Ink was removed within 1 minute.
B: Ink was removed after 1 minute.
C: Even after 2 minutes, ink was not removed over 10 minutes.

[Evaluation of Drying Speed in Wet with Water]

About 1 cc of pure water was dropped onto the hydrophilic member obtained in the above, and statically kept as such in an environment at 25° C. and 50% RH. This was watched at regular intervals of 5 minutes, and the time taken for drying up the water drop was measured.

The evaluation test results are shown in Tables 1 to 4 below.

TABLE 1

| | Evaluation of Properties | | | | | | |
|---|---|---|---|---|---|---|---|
| | Surface Free Energy | Light Transmittance | Abrasion Resistance | Scratch Resistance | Fogging Resistance | Soiling Resistance | Drying Speed in wet with water |
| Example 1 | 82 mN/m | 90% | B | 20 g | A | A | 5 minutes |
| Example 2 | 81 mN/m | 92% | B | 45 g | A | A | 5 minutes |
| Example 3 | 83 mN/m | 90% | B | 50 g | A | A | 5 minutes |
| Example 4 | 82 mN/m | 93% | B | 45 g | A | A | 5 minutes |
| Example 5 | 82 mN/m | 91% | B | 40 g | A | A | 5 minutes |
| Example 6 | 80 mN/m | 88% | A | 65 g | A | A | 5 minutes |
| Example 7 | 81 mN/m | 95% | A | 80 g | A | A | 5 minutes |
| Example 8 | 81 mN/m | 92% | A | 135 g | A | A | 5 minutes |

TABLE 1-continued

| | Evaluation of Properties | | | | | | |
|---|---|---|---|---|---|---|---|
| | Surface Free Energy | Light Transmittance | Abrasion Resistance | Scratch Resistance | Fogging Resistance | Soiling Resistance | Drying Speed in wet with water |
| Example 9 | 83 mN/m | 89% | A | 140 g | A | A | 5 minutes |
| Example 10 | 83 mN/m | 93% | A | 130 g | A | A | 5 minutes |
| Example 11 | 80 mN/m | 90% | A | 135 g | A | A | 5 minutes |
| Example 12 | 83 mN/m | 88% | A | 145 g | A | A | 5 minutes |
| Example 13 | 81 mN/m | 87% | A | 130 g | A | A | 5 minutes |
| Example 14 | 80 mN/m | — | A | 135 g | A | A | 5 minutes |
| Example 15 | 81 mN/m | 90% | A | 65 g | A | A | 5 minutes |
| Example 16 | 82 mN/m | — | A | 85 g | — | A | 5 minutes |
| Example 17 | 84 mN/m | 91% | A | 185 g | A | A | 5 minutes |
| Example 18 | 80 mN/m | 92% | A | 205 g | A | A | 5 minutes |
| Example 19 | 82 mN/m | 94% | A | 150 g | A | A | 5 minutes |
| Example 20 | 84 mN/m | 95% | A | 165 g | A | A | 5 minutes |
| Example 21 | 81 mN/m | 94% | A | 135 g | A | A | 5 minutes |
| Example 22 | 83 mN/m | 91% | A | 120 g | A | A | 5 minutes |
| Example 23 | 84 mN/m | 92% | A | 135 g | A | A | 5 minutes |

As is obvious from Table 1, the hydrophilic film formed of the hydrophilic composition of the invention has excellent soiling resistance and fogging resistance. Also, the hydrophilic film has excellent scratch resistance by increasing the film thickness. Further, the hydrolysis and polycondensation are promoted by addition of a catalyst, thereby the hydrophilic member having excellent abrasion resistance and scratch resistance can be provided.

scratch resistance than the hydrophilic film (Comparative Example 1) formed of the comparative hydrophilic polymer (i) which is a hydrophilic polymer in the conventional art. When compared with Comparative Example 2, it is obvious that the hydrophilic films of the invention may keep their good hydrophilicity since the polymer has a highly-hydrophilic functional group as the linking group that bonds the

TABLE 2

| | Evaluation of Properties | | | | | | |
|---|---|---|---|---|---|---|---|
| | Surface Free Energy | Light Transmittance | Abrasion Resistance | Scratch Resistance | Fogging Resistance | Soiling Resistance | Drying Speed in wet with water |
| Example 24 | 82 mN/m | 88% | B | 30 g | A | A | 5 minutes |
| Example 25 | 83 mN/m | 87% | B | 20 g | A | A | 5 minutes |
| Example 26 | 83 mN/m | 88% | B | 35 g | A | A | 5 minutes |
| Example 27 | 80 mN/m | 83% | B | 40 g | A | A | 5 minutes |
| Example 28 | 83 mN/m | 87% | A | 80 g | A | A | 5 minutes |
| Example 29 | 81 mN/m | 87% | A | 100 g | A | A | 5 minutes |
| Example 30 | 80 mN/m | 90% | A | 115 g | A | A | 5 minutes |
| Example 31 | 80 mN/m | 86% | A | 105 g | A | A | 5 minutes |
| Example 32 | 79 mN/m | 87% | A | 100 g | A | A | 5 minutes |
| Example 33 | 82 mN/m | 88% | A | 95 g | A | A | 5 minutes |
| Example 34 | 80 mN/m | 87% | A | 95 g | A | A | 5 minutes |
| Example 35 | 82 mN/m | 88% | A | 105 g | A | A | 5 minutes |
| Example 36 | 82 mN/m | 88% | A | 115 g | A | A | 5 minutes |
| Example 37 | 80 mN/m | 87% | A | 125 g | A | A | 5 minutes |
| Example 38 | 81 mN/m | — | A | 105 g | A | A | 5 minutes |
| Example 39 | 84 mN/m | 94% | A | 50 g | A | A | 5 minutes |
| Example 40 | 82 mN/m | — | A | 90 g | — | A | 5 minutes |
| Example 41 | 82 mN/m | 88% | A | 130 g | A | A | 5 minutes |
| Example 42 | 84 mN/m | 90% | A | 160 g | A | A | 5 minutes |
| Example 43 | 83 mN/m | 93% | A | 125 g | A | A | 5 minutes |
| Example 44 | 81 mN/m | 88% | A | 130 g | A | A | 5 minutes |
| Example 45 | 83 mN/m | 89% | A | 100 g | A | A | 5 minutes |
| Example 46 | 83 mN/m | 93% | A | 100 g | A | A | 5 minutes |
| Example 47 | 82 mN/m | 88% | A | 105 g | A | A | 5 minutes |
| Comp. Ex. 1 | 83 mN/m | 82% | B | 5 g | A | A | 10 minutes |
| Comp. Ex. 2 | 70 mN/m | 80% | A | 90 g | B | C | 20 minutes |
| Comp. Ex. 3 | 90 mN/m | 90% | C | <5 g | A | A | 5 minutes |

As is obvious from Table 2, adding a specific alkoxide compound to the hydrophilic composition gave hydrophilic members having excellent scratch resistance. Adding a specific alkoxide improved the abrasion resistance and the scratch resistance of the films even though they are thin. This is attributed to the strong crosslinked structure formed by the addition of the inorganic component. In addition, the hydrophilic films of the invention had better abrasion resistance and polymer main chain and the silane coupling group therein, and in addition, it has become known that the drying speed of the hydrophilic films of the invention, when wetted with water, is high. On the other hand, the hydrophilic member produced by sticking a photocatalyst film to a glass substrate (Comparative Example 3) had poor abrasion resistance and poor scratch resistance, and its practical use is problematic.

TABLE 3

| | Evaluation of Properties | | | | | | |
|---|---|---|---|---|---|---|---|
| | Surface Free Energy | Light Transmittance | Abrasion Resistance | Scratch Resistance | Fogging Resistance | Soiling Resistance | Drying Speed in wet with water |
| Example 48 | 81 mN/m | 93% | A | 205 g | A | A | 5 minutes |
| Example 49 | 84 mN/m | 95% | A | 190 g | A | A | 5 minutes |
| Example 50 | 80 mN/m | 90% | A | 215 g | A | A | 5 minutes |
| Example 51 | 80 mN/m | 95% | A | 205 g | A | A | 5 minutes |
| Example 52 | 83 mN/m | 93% | A | 220 g | A | A | 5 minutes |
| Example 53 | 81 mN/m | 89% | A | 215 g | A | A | 5 minutes |
| Example 54 | 81 mN/m | — | A | 200 g | A | A | 5 minutes |
| Example 55 | 80 mN/m | 95% | A | 135 g | A | A | 5 minutes |
| Example 56 | 84 mN/m | — | A | 150 g | — | A | 5 minutes |
| Example 57 | 82 mN/m | 88% | A | 245 g | A | A | 5 minutes |
| Example 58 | 80 mN/m | 90% | A | 280 g | A | A | 5 minutes |
| Example 59 | 83 mN/m | 91% | A | 230 g | A | A | 5 minutes |
| Example 60 | 80 mN/m | 92% | A | 235 g | A | A | 5 minutes |
| Example 61 | 81 mN/m | 94% | A | 205 g | A | A | 5 minutes |
| Example 62 | 79 mN/m | 90% | A | 215 g | A | A | 5 minutes |
| Example 63 | 80 mN/m | 89% | A | 195 g | A | A | 5 minutes |

TABLE 4

| | Evaluation of Properties | | | | | | |
|---|---|---|---|---|---|---|---|
| | Surface Free Energy | Light Transmittance | Abrasion Resistance | Scratch Resistance | Fogging Resistance | Soiling Resistance | Drying Speed in wet with water |
| Example 64 | 83 mN/m | 90% | A | 190 g | A | A | 5 minutes |
| Example 65 | 84 mN/m | 88% | A | 185 g | A | A | 5 minutes |
| Example 66 | 80 mN/m | 88% | A | 190 g | A | A | 5 minutes |
| Example 67 | 83 mN/m | 90% | A | 180 g | A | A | 5 minutes |
| Example 68 | 81 mN/m | 95% | A | 190 g | A | A | 5 minutes |
| Example 69 | 81 mN/m | 92% | A | 195 g | A | A | 5 minutes |
| Example 70 | 80 mN/m | 85% | A | 200 g | A | A | 5 minutes |
| Example 71 | 80 mN/m | 91% | A | 185 g | A | A | 5 minutes |
| Example 72 | 81 mN/m | 97% | A | 200 g | A | A | 5 minutes |
| Example 73 | 82 mN/m | — | A | 200 g | A | A | 5 minutes |
| Example 74 | 82 mN/m | 89% | A | 125 g | A | A | 5 minutes |
| Example 75 | 81 mN/m | — | A | 130 g | — | A | 5 minutes |
| Example 76 | 84 mN/m | 88% | A | 220 g | A | A | 5 minutes |
| Example 77 | 85 mN/m | 86% | A | 240 g | A | A | 5 minutes |
| Example 78 | 81 mN/m | 90% | A | 225 g | A | A | 5 minutes |
| Example 79 | 80 mN/m | 88% | A | 230 g | A | A | 5 minutes |
| Example 80 | 82 mN/m | 92% | A | 190 g | A | A | 5 minutes |
| Example 81 | 80 mN/m | 88% | A | 205 g | A | A | 5 minutes |
| Example 82 | 82 mN/m | 92% | A | 190 g | A | A | 5 minutes |

As is obvious from Tables 3 and 4, the hydrophilic member of the invention could have more excellent scratch resistance by providing an undercoat layer between the substrate and the hydrophilic layer therein. This is attributed to the adhesiveness between the glass substrate and the undercoat layer and also the adhesiveness between the undercoat layer and the hydrophilic layer could be increased and the film strength could be thereby increased.

According to the invention, there are provided a hydrophilic composition useful for forming a hydrophilic film having excellent soiling resistance and fogging resistance and rapid driability in wet with water or the like and having excellent abrasion resistance, on the surface of various substrates; and a hydrophilic member having the hydrophilic film and therefore having excellent soiling resistance and fogging resistance and rapid driability in wet with water or the like and having excellent abrasion resistance and scratch resistance.

The entire disclosure of each and every foreign patent application from which the benefit of foreign priority has been claimed in the present application is incorporated herein by reference, as if fully set forth.

What is claimed is:
1. A hydrophilic member comprising:
a substrate;
a hydrophilic film formed by heating and drying a hydrophilic composition; and
an undercoat layer comprising a nonvolatile catalyst between the substrate and the hydrophilic film,
wherein the hydrophilic composition comprises:
(A) a hydrophilic polymer represented by the following general formula (I);
(B) an alkoxide compound of an element selected from Si, Ti, Zr and Al; and
(C) a catalyst that promotes the reaction of (A) the hydrophilic polymer and (B) the alkoxide compound:

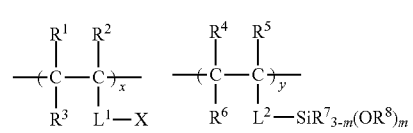

Formula (I)

wherein $R^1$ to $R^8$ each independently represents a hydrogen atom or a hydrocarbon group having 8 or less carbon atoms, $L^2$ represents a single bond, or a polyvalent organic linking group having at least one structure selected from the group consisting of —CONH—, —NHCONH—, —OCONH—, —SO,NH— and —SO$_3$—, m represents an integer of from 1 to 3, x and y represent a polymerization ratio by mol of the repeating units of the formula (I) and the polymerization molar ratio x/y is within a range of from 99/1 to 10/90, and wherein (a) $L^1$ represents a polyvalent organic linking group comprising from 1 to 200 carbon atoms, provided that at least one —CH$_2$— group is present, and X represents —OH, or (b) $L^1$ represents a single bond or a polyvalent organic linking group, and X represents —CON($R_s$)($R_b$), —NHCOR$_d$, —NHCO$_2$R$_a$, —OCON($R_a$)($R_b$), —NHCON($R_a$)($R_b$), —SO$_3$R$_e$, —OSO$_3$R$_e$, —SO$_2$R$_d$, —NHSO$_2$R$_d$, —SO$_2$N($R_a$)($R_b$), —PO$_3$H$_2$, —OPO$_3$H$_2$ or —PO$_3$($R_d$)($R_e$), wherein $R_a$ and $R_b$ each independently represents a hydrogen atom or a linear, branched or cyclic alkyl group having from 1 to 8 carbon atoms, $R_d$ represents a linear, branched or cyclic alkyl group having from 1 to 8 carbon atoms, and $R_e$ represents a hydrogen atom, or a linear, branched or cyclic alkyl group having from 1 to 8 carbon atoms, or an alkali metal, an alkaline earth metal, or an onium, wherein said hydrophilic film has a surface free energy of 79-85 mN/m.

2. The hydrophilic member according to claim 1, wherein the undercoat layer is formed by hydrolysis and polycondensation of a composition comprising an alkoxide compound of an element selected from Si, Ti, Zr and Al, and the nonvolatile catalyst.

3. The hydrophilic member according to claim 1, wherein the substrate is any of glass, plastic, metal and tile.

4. A hydrophilic member comprising:

a substrate;

a hydrophilic film formed by heating and drying a hydrophilic composition; and an undercoat layer between the substrate and the hydrophilic film, wherein the undercoat layer comprises a nonvolatile catalyst, wherein the hydrophilic composition comprises:

(A) a hydrophilic polymer represented by the following general formula (I) (C) a catalyst that promotes the reaction of (A) the hydrophilic polymer:

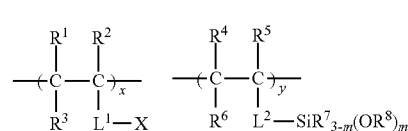

Formula (I)

wherein $R^1$ to $R^8$ each independently represents a hydrogen atom or a hydrocarbon group having 8 or less carbon atoms, $L^2$ represents a single bond, or a polyvalent organic linking group having at least one structure selected from the group consisting of —CONH—, —NHCONH—, —OCONH—, —SO$_2$NH— and —SO$_3$—, m represents an integer of from 1 to 3, x and y represent a polymerization ratio by mol of the repeating units of the formula (I) and the polymerization molar ratio x/y is within a range of from 99/1 to 10/90, and wherein (a) $L^1$ represents a polyvalent organic linking group comprising from 1 to 200 carbon atoms, provided that at least one —CH$_2$— group is present, and X represents —OH, or (b) $L^1$ represents a single bond or a polyvalent organic linking group, and X represents —CON($R_a$)($R_b$), —NHCOR$_d$, —NHCO$_2$R$_a$, —OCON($R_a$)($R_b$), —NHCON($R_a$)($R_b$), —SO$_3$R$_e$, —OSO$_3$R$_e$, —SO$_2$R$_d$, —NHSO$_2$R$_d$, —SO$_2$N($R_a$)($R_b$), —PO$_3$H$_2$, —OPO$_3$H$_2$ or —PO$_3$($R_d$)($R_e$), wherein $R_a$ and $R_b$ each independently represents a hydrogen atom or a linear, branched or cyclic alkyl group having from 1 to 8 carbon atoms, $R_d$ represents a linear, branched or cyclic alkyl group having from 1 to 8 carbon atoms, and $R_e$ represents a hydrogen atom, or a linear, branched or cyclic alkyl group having from 1 to 8 carbon atoms, or an alkali metal, an alkaline earth metal, or an onium, wherein said hydrophilic film has a surface free energy of 79-85 mN/m.

5. The hydrophilic member according to claim 4, wherein the undercoat layer is formed by hydrolysis and polycondensation of a composition comprising an alkoxide compound of an element selected from Si, Ti, Zr and Al, and the nonvolatile catalyst.

6. The hydrophilic member according to claim 4, wherein the substrate is any of glass, plastic, metal and tile.

* * * * *